United States Patent [19]

Hoffman et al.

[11] 4,394,727

[45] Jul. 19, 1983

[54] MULTI-PROCESSOR TASK DISPATCHING APPARATUS

[75] Inventors: Roy L. Hoffman, Pine Island; Merle E. Houdek, Rochester; Larry W. Loen, Rochester; Frank G. Soltis, Rochester, all of Minn.

[73] Assignee: International Business Machines Corporation, Armonk, N.Y.

[21] Appl. No.: 260,543

[22] Filed: May 4, 1981

[51] Int. Cl.³ .............................................. G06F 9/46
[52] U.S. Cl. ............................................. 364/200
[58] Field of Search .......................... 364/200, 900; 340/825.12

[56] References Cited

U.S. PATENT DOCUMENTS

| | | | |
|---|---|---|---|
| 3,363,234 | 1/1968 | Erickson | 364/200 |
| 3,421,150 | 6/1969 | Tucker | 364/200 |
| 3,449,722 | 6/1969 | Tucker | 364/200 |
| 3,496,551 | 2/1970 | Driscoll | 364/200 |
| 3,530,438 | 9/1970 | Mellen | 364/200 |
| 3,566,357 | 2/1971 | Ling | 364/200 |
| 3,643,227 | 2/1972 | Smith | 364/200 |
| 3,648,253 | 3/1972 | Mullery | 364/200 |
| 4,015,242 | 3/1977 | Anceau | 364/200 |
| 4,047,161 | 9/1977 | Davis | 364/200 |
| 4,073,005 | 2/1978 | Parkin | 364/200 |
| 4,103,330 | 7/1978 | Thacker | 364/200 |
| 4,123,794 | 10/1978 | Matsumato | 364/200 |
| 4,130,865 | 12/1978 | Heart | 364/200 |
| 4,177,513 | 12/1979 | Hoffman | 364/200 |
| 4,253,144 | 2/1981 | Bellany | 364/200 |
| 4,253,146 | 2/1981 | Bellany | 364/200 |

Primary Examiner—James D. Thomas
Assistant Examiner—David Y. Eng
Attorney, Agent, or Firm—Donald F. Voss

[57] ABSTRACT

Task dispatching for an asymmetric or symmetric multi-processor system is provided where all the processors are dispatched from a single task dispatching queue. The workload, i.e. tasks, of the multiprocessor system is distributed to the available processors. Each processor includes a task dispatcher and a signal dispatcher. The signal dispatcher runs in a processor whenever a task dispatching element (TDE) is put on the task dispatching queue (TDQ) as a result of the task running in the processor. The signal dispatcher examines the TDEs enqueued on the TDQ and determines if any task dispatcher should be invoked, i.e. if any processor is running a lower priority task a task switch should occur. If so, it signals the selected processor to invoke its task dispatcher. After completing the task switch, the selected processor must invoke its signal dispatcher to determine if the task it had been performing should now be performed on some other processor in the multiprocessor system.

6 Claims, 33 Drawing Figures

MULTI-PROCESSOR TASK DISPATCHING APPARATUS

TECHNICAL FIELD

This invention relates to task dispatching apparatus for asymmetric or symmetric multiprocessor systems where all processors are dispatched from a single task dispatching queue.

BACKGROUND ART

In U.S. Pat. No. 4,073,005 tasks can be restricted to certain processors of the multiprocessor system and can be redispatched to run on other processors. This patent does not include a mechanism such as the signal dispatcher of the present invention which is invoked whenever a task element is put on the task dispatching queue to let other processors know that they are not processing the highest priority task and should invoke their task dispatcher to do a task switch. The present invention provides an advantage over the prior art in that it ensures that a processor of the multiprocessor system is processing the highest priority task.

DISCLOSURE OF THE INVENTION

The tasks of the multiprocessor system are distributed to the available processors. Each processor of the multiprocessor computer system is operable to execute instructions of the task and has a task dispatcher and a signal dispatcher. The signal dispatcher determines which processor is eligible to execute a higher priority task than is being currently executed by that processor. It signals the eligible processor to activate its task dispatcher. The task dispatcher performs the task switch and determines which task is to be dispatched. The processor performing the task switch must then run its signal dispatcher to determine if the task it had been performing should be run by some other processor.

BRIEF DESCRIPTION OF THE DRAWINGS

FIGS. 2-1 and 2-2 with FIG. 2-1 disposed above FIG. 2-2 taken together are a block diagram of a processor of the multiprocessor system embodying the invention;

FIGS. 12-1 and 12-2 taken together with FIG. 12-1 disposed above FIG. 12-2 are a flow diagram illustrating the signal dispatcher;

FIGS. 13-1, 13-2 and 13-3 taken together as shown in FIG. 13 are a flow diagram illustrating the CPU cycles for signal dispatcher cycles;

FIGS. 15-1, 15-2 and 15-3 taken together as in FIG. 15 are a flow diagram of dispatch cycles;

DESCRIPTION

Figure 1:
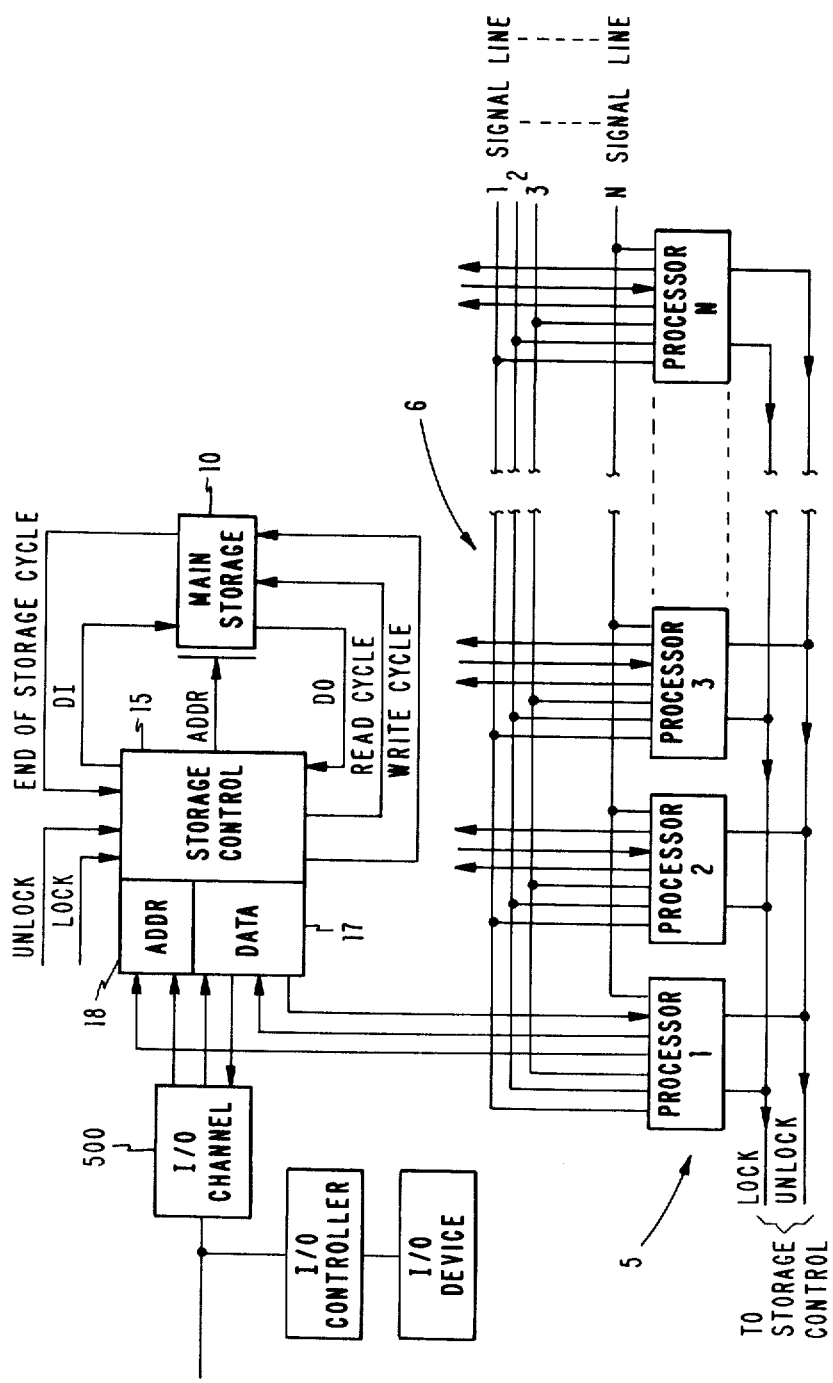
FIG. 1 is a schematic diagram illustrating the multiprocessor system in which the present invention is incorporated.

With reference to the drawings and particularly to FIG. 1, the invention is shown by way of example as being incorporated in a multiprocessor system consisting of n processors 5 which are interconnected by signal lines 6. The processors 5 are each of the type of processor set forth in U.S. Pat. No. 4,177,513 dated Dec. 4, 1979 for Task Handling Apparatus for a Computer System which is incorporated herein by reference. The processor of U.S. Pat. No. 4,177,513 has been modified according to the present invention. The like elements, however, will be designated by the same reference characters.

The task handling apparatus of U.S. Pat. No. 4,177,513 has been extended by the present invention to enable multiprocessors to be dispatched. The processors of the multiprocessing system, i.e., two or more processors, access instructions and data from a common main storage 10. There can be an active task for each processor where each processor is independently executing an instruction stream.

A multiprocessor system is defined as being asymmetrical if the processors do not have the same features and channel paths to input/output devices. A multiprocessor system is defined as being symmetrical if all processors have the same features and channel paths to the input/output devices. Symmetrical systems can run any task on any processor whereas asymmetrical systems cannot. The present invention relates to task dispatching for asymmetric or symmetric multiprocessor systems where all processors are dispatched from a single task dispatching queue.

The single task dispatching queue is an advantage in a multiprocessor system because it is a simple mechanism whereby the workload, i.e., the tasks of the system, can be distributed to the available processors. Systems having a separate task dispatching queue for each processor are less flexible and are prone to workload unbalance because one processor may have many tasks to process while another one could have none. The arrangement of a single task dispatching queue in the multiprocessor system provides for self balancing of the total system workload because each task is dispatched on the first available processor that can accept it.

Figures 1, 2:
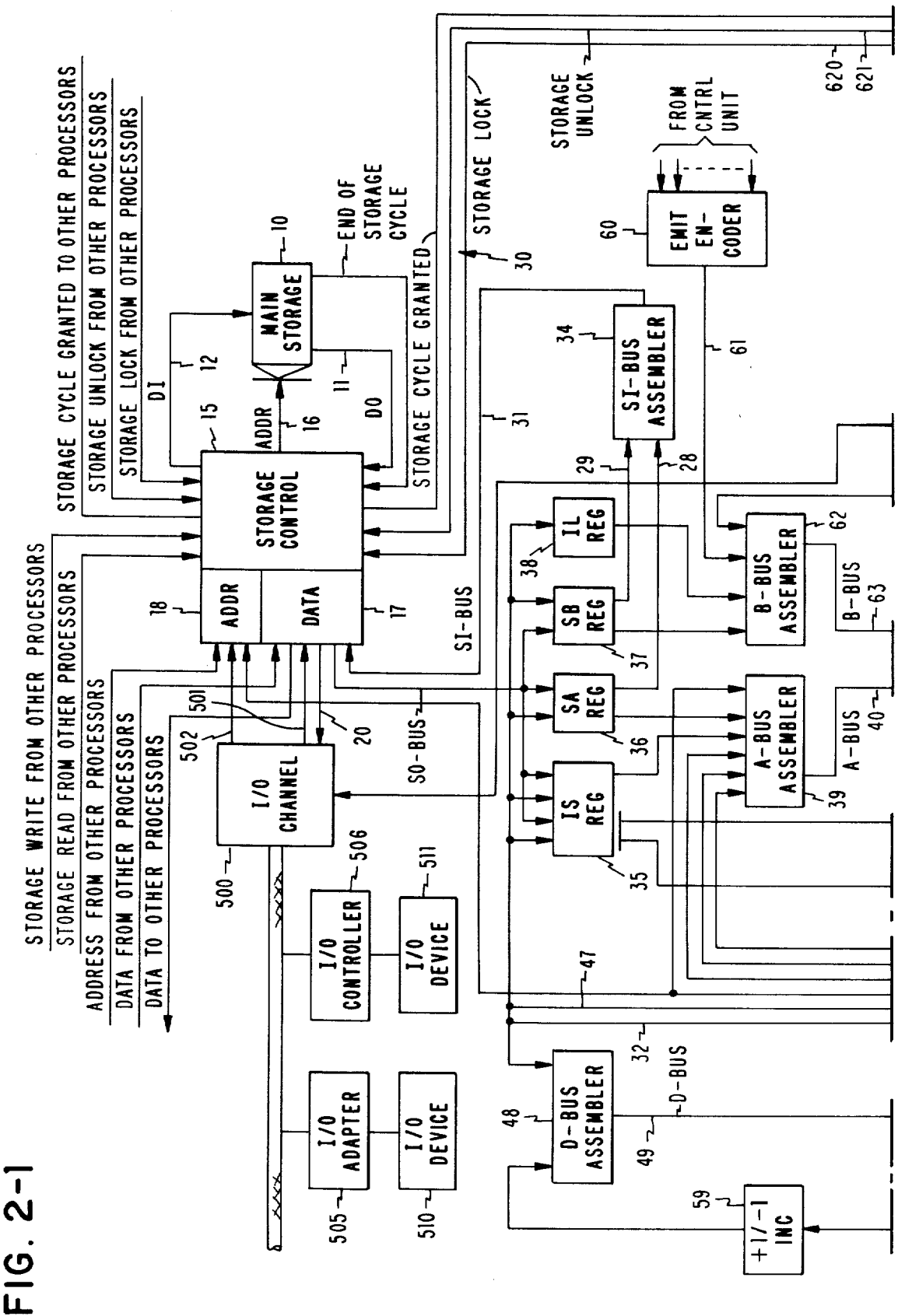
Figure 2:
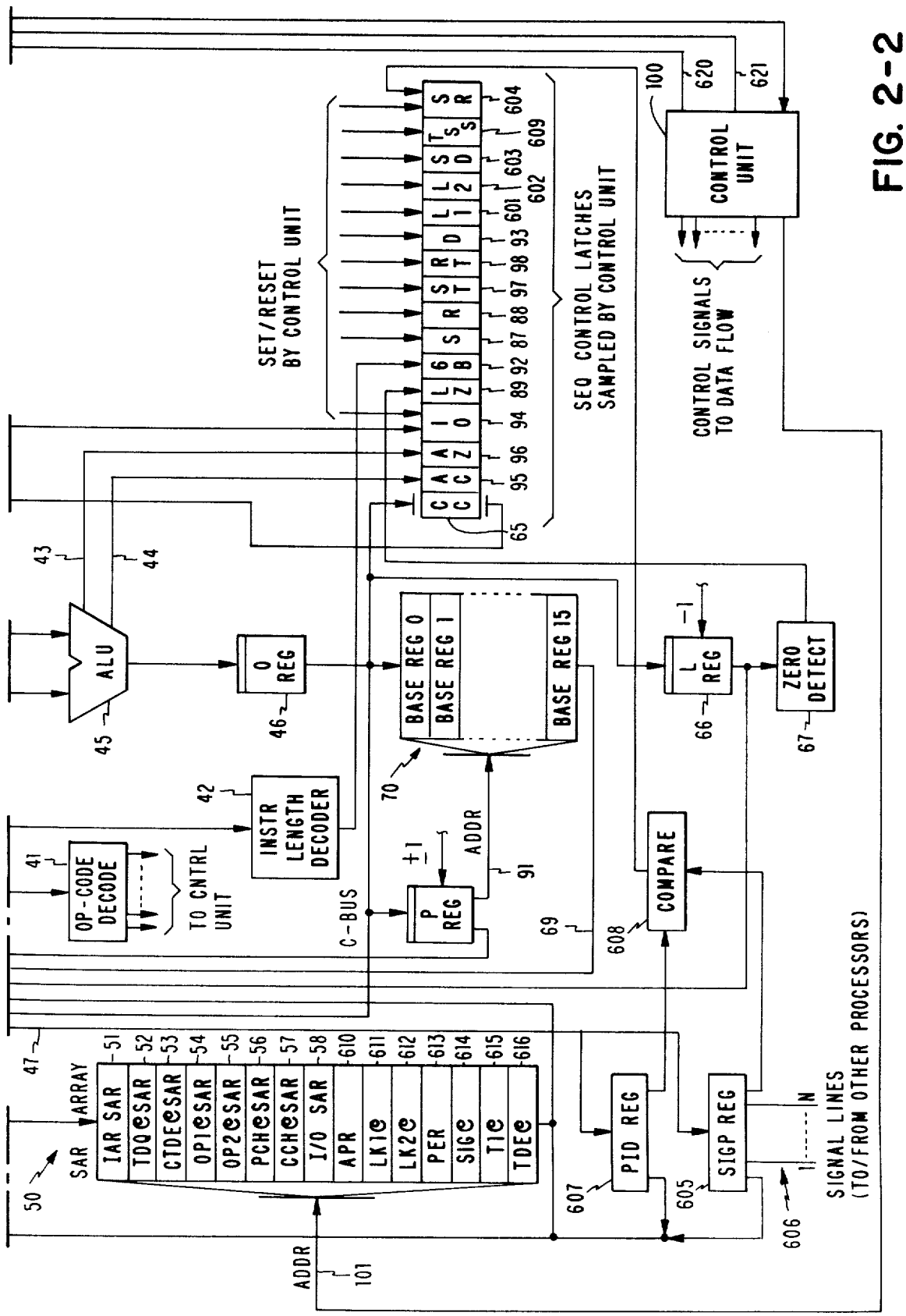
Figure 3:
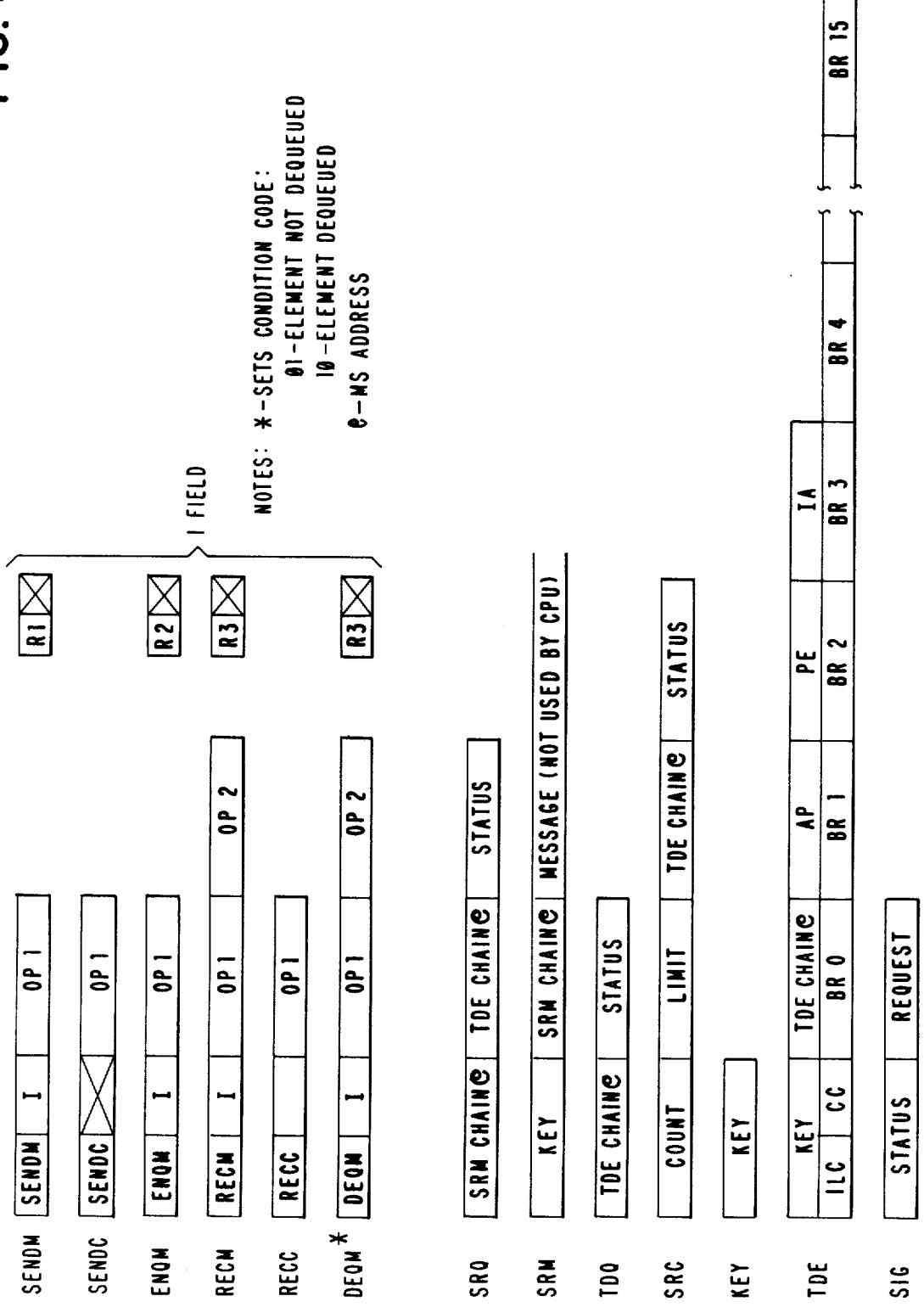
FIG. 3 is a diagram illustrating the format of queueing instructions and objects.
Figure 4:
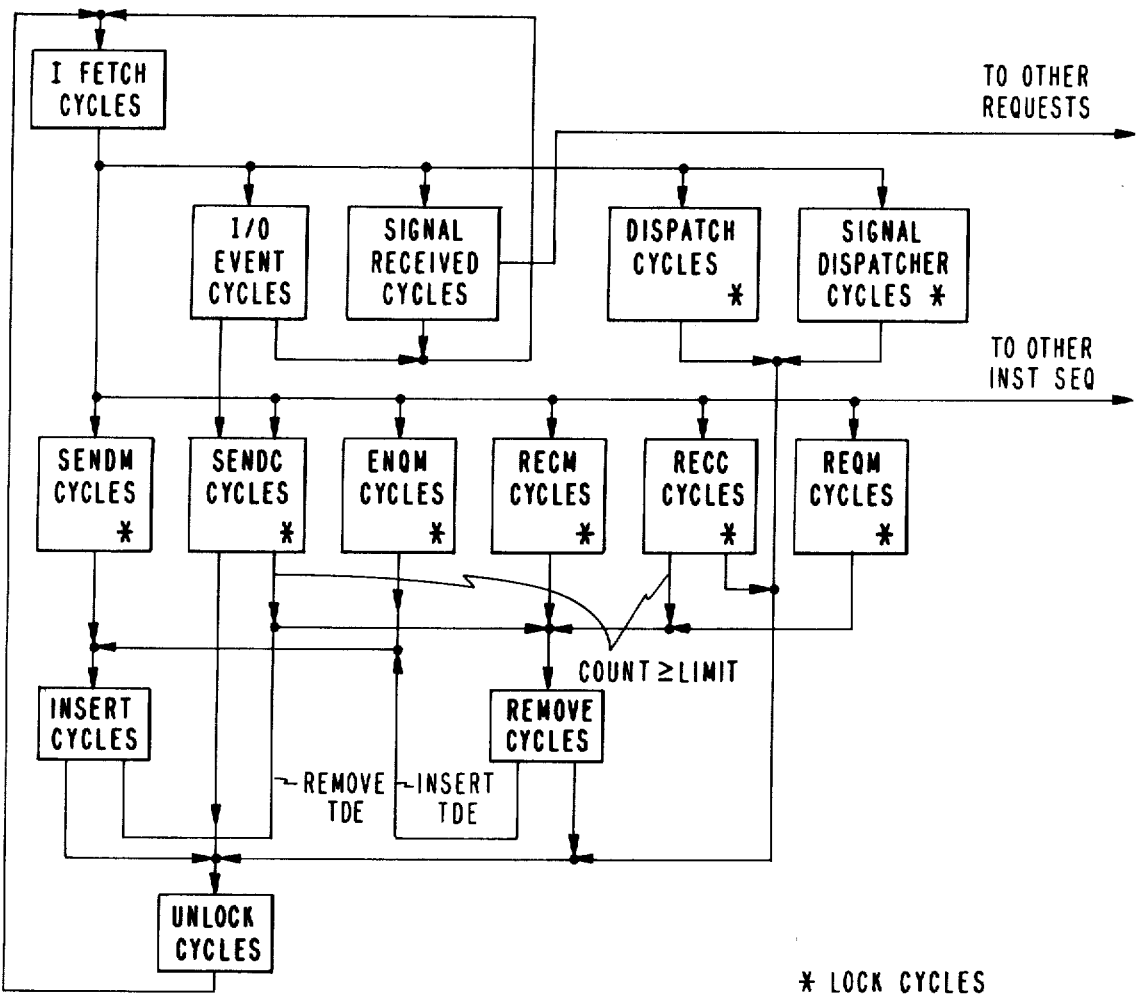
FIG. 4 is a diagram illustrating control unit cycle sequence interrelationships.

The task dispatching queue (TDQ) of the present invention is substantially the same as shown in FIG. 4-1 and 4-2 of the referenced U.S. Pat. No. 4,177,513 except that the TDQ object as shown in FIG. 3 of this application includes a status field which, among other information, contains a lock bit which functions to indicate when the TDQ object is being used by one of the processors and to exclude the other processors from using the TDQ object once it has been locked until the TDQ becomes unlocked. Thus in the present invention, the processors each have the responsibility for locking the TDQ object and unlocking it.

It is seen that the exclusive use lock is a serialization mechanism such that a shared resource, for example a queue, can be manipulated in any desired manner without any interference from another processor. For the task dispatching queue (TDQ) the lock mechanism assures that when the task dispatcher of a processor is scanning the TDQ, no changes can occur which might violate the task dispatcher logic. For other shared resources such as send/receive queues (SRQs) and send-/receive counters (SRCs) the lock assures integrity when, for example, a queue is being updated by adding or deleting an element.

The task dispatching elements (TDEs) have been modified as shown in FIG. 3. Each TDE has an active processor field (AD) for indicating which processor is running the task. This field has one bit for each processor. The bit is in the zero state if the processor is not active, and in the one state if it is active. Thus the AP field will contain all binary zeros if a task is inactive or will contain a single binary one when the task is active. The TDE also has a processor eligibility field (PE) for indicating on which processors the task is eligible to run. If the task is eligible to run on a particular processor, the bit state is one and if it is not eligible the bit state is zero. Thus, one or more bits in the processor eligibility field can be in the one state. A task eligible to run on only one processor has one of N bits set to binary one.

In this invention, in order to ensure that each processor is processing the highest priority task that it is able to process, each processor has the responsibility to signal another processor whenever it is interrogating the TDQ and it finds a TDE waiting on the TDQ which is of a higher priority than the TDE presently being processed by that other processor. The processors communicate with each other by means of a signal mechanism. A signal object (SIG), as shown in FIG. 3 in the present invention, has been added. The SIG object includes status and request fields. The status field is for indicating if the signal facility is in use. The request field is an encoded field for indicating the action to be taken by another processor. In other words, a processor can use the signal object to request another processor to take some particular action. In the present invention the processor uses the signal object request field to command another processor to invoke its task dispatcher. Thus the signal mechanism includes a single shared storage location and the interconnecting lines 6 between the processors 5. When, for example, processor 1 wants to communicate with processor 3, processor 1 locks the signaling mechanism, i.e., the shared storage location, and places its request in the request field and then activates the signal line 6 from it to processor 3. Processor 3 periodically monitors the signal lines 6 to it and upon detecting an active signal line 6, it performs the requested operation and unlocks the signaling mechanism.

Whenever a TDE is moved to the TDQ as a result of a send operation as described in the referenced U.S. Pat. No. 4,177,513 the signal dispatcher is invoked in the processor which executed the send. As stated, the function of the signal dispatcher is to identify if there is a processor which is eligible to run some inactive task which is of higher priority than the task that it is currently running. If such a situation is found, the signal dispatcher causes the identified processor to invoke its task dispatcher. Invocation of the task dispatcher causes a task switch to the higher priority task. It should be noted that if a task switch does occur, the task which becomes inactive may be eligible to run on some other processor. Thus whenever a task switch occurs, the processor performing the task switch must invoke its signal dispatcher mechanism.

Whenever a TDE is removed from the TDQ as a result of a receive operation, the task dispatcher in the processor which executed the receive is run. If a task switch occurs, the processor performing the task switch invokes its signal dispatcher mechanism and the sequence of operations as just described relative to the signal dispatcher mechanism takes place.

The signal dispatcher mechanism uses the processor eligibility (PE) field and the active processor (AP) field in the task dispatching element (TDE) on the TDQ to select a processor which is eligible to run a higher priority task than it is currently running. The signal dispatcher mechanism searches the TDQ looking for a TDE whose active processor field contains all zeros indicating that no processor is executing this task. As each TDE with a non-zero active processor field is encountered, a record is made of which processor is active. Thus when a TDE with a zero active processor field is encountered, a record of all processors which are executing higher priority tasks is known. Once the TDE is selected the signal dispatcher mechanism uses the eligible processor field to determine if any processor which is not running a higher priority task is eligible to run this task. If none are eligible, the signal dispatcher function continues to search down the TDQ until an eligible processor is found for a TDE or until it is determined that all processors are active. If more than one processor is eligible and not running a higher priority task, the signal dispatcher function selects a processor which is idle or if none are idle, it selects the processor which is running the task with the lowest priority.

After the signal dispatcher mechanism has selected a processor, it uses the signal facility to notify the selected processor to run its task dispatcher. If the selected processor is the one on which the signal dispatcher is being run, the signal mechanism is not used and the task dispatcher is run directly.

Figure 7:
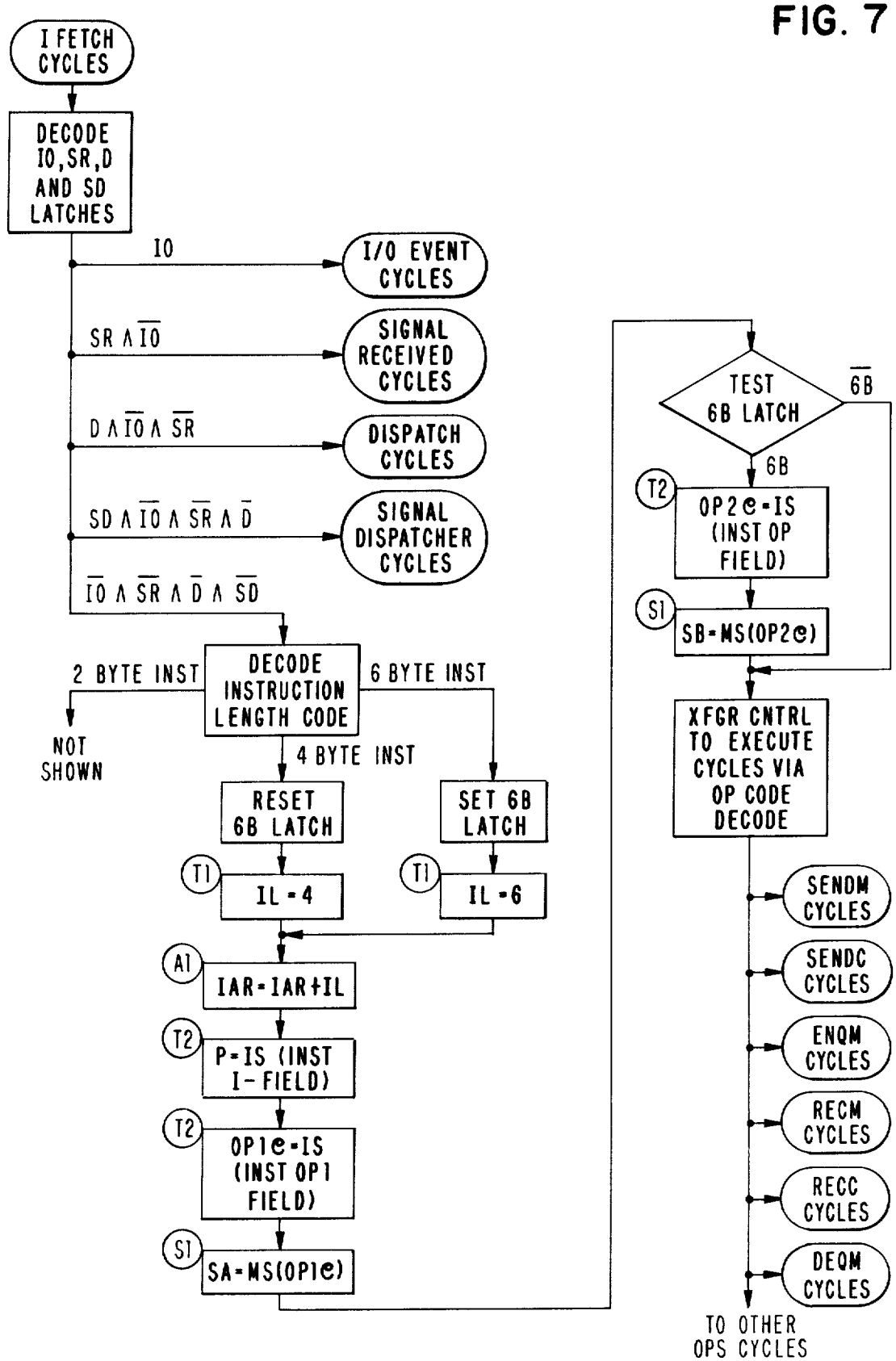
FIG. 7 is a flow diagram illustrating I-Fetch cycles.

As seen in FIG. 4, the signal receive cycles and signal dispatcher cycles are entered from I-Fetch cycles which are shown in FIG. 7. The I-Fetch cycles in the present application, except for the decode of sequence control latches, are the same as the I-Fetch cycles shown and described in the referenced U.S. Pat. No. 4,177,513. In the present invention the first step of I-fetch cycles is to decode signal dispatcher (SD) latch 603 and signal receive (SR) latch 604 in addition to decoding D latch 93 and IO latch 94. Latch 603 (SD), FIG. 2-2, is a sequence control latch for controlling the request to invoke or not invoke the signal dispatcher cycles. SD latch 603 is set by remove and dispatch cycles and reset by signal dispatcher cycles. Sequence control latch 604 controls the request to invoke or not invoke signal receive cycles. SR latch 604 is set by the signal dispatcher cycles or another processor is reset by signal receive cycles. Signal receive cycles are invoked if latch 604 is set and I/O latch 94 is not set. Signal dispatcher cycles are invoked if latch 603 is set and latches 93, 94 and 604 are not set.

Figure 20:
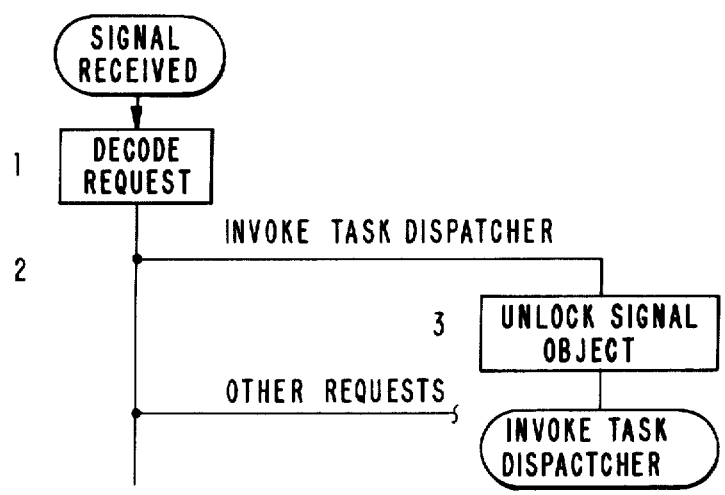
FIG. 20 is a flow diagram illustrating signal processing.
Figure 21:
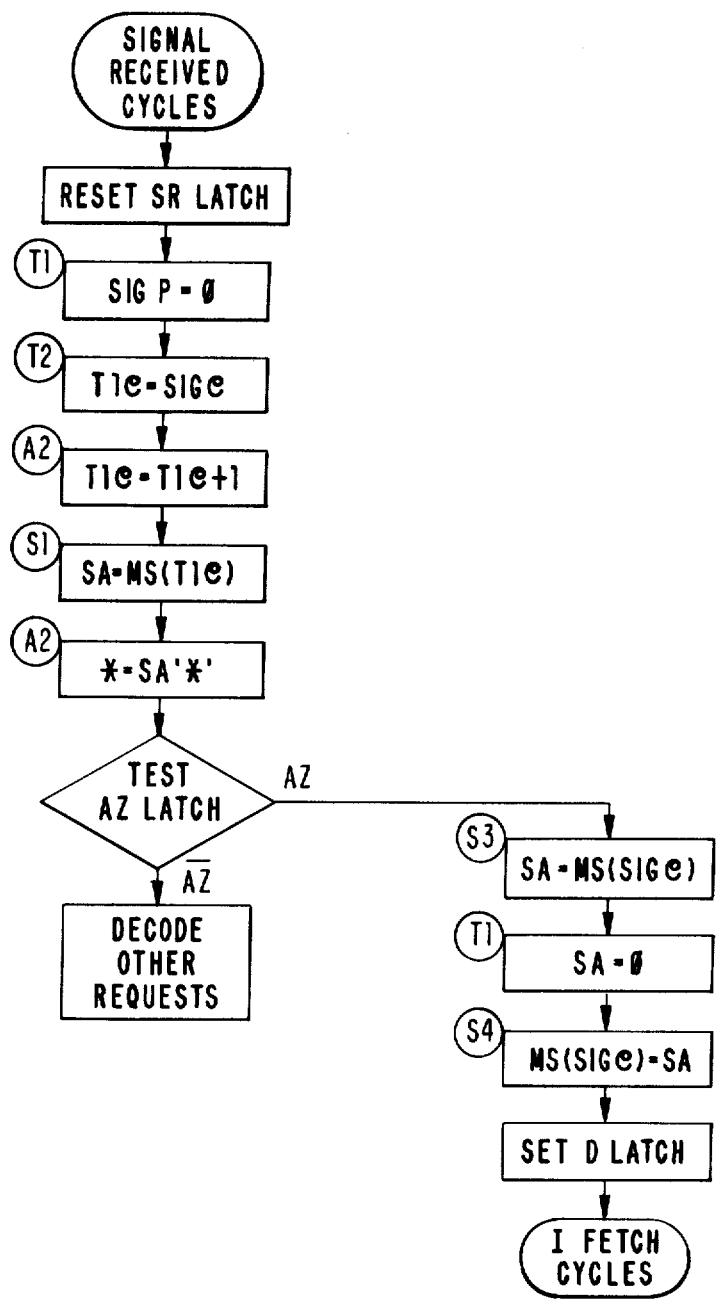
FIG. 21 is a flow diagram illustrating the CPU cycles for signal receive cycles and, FIGS. 22-1, 22-2 and 22-3 taken together as in FIG. 22 are a logic diagram of storage control shown in block form in FIGS. 1 and 2-1.
Figures 1, 22:
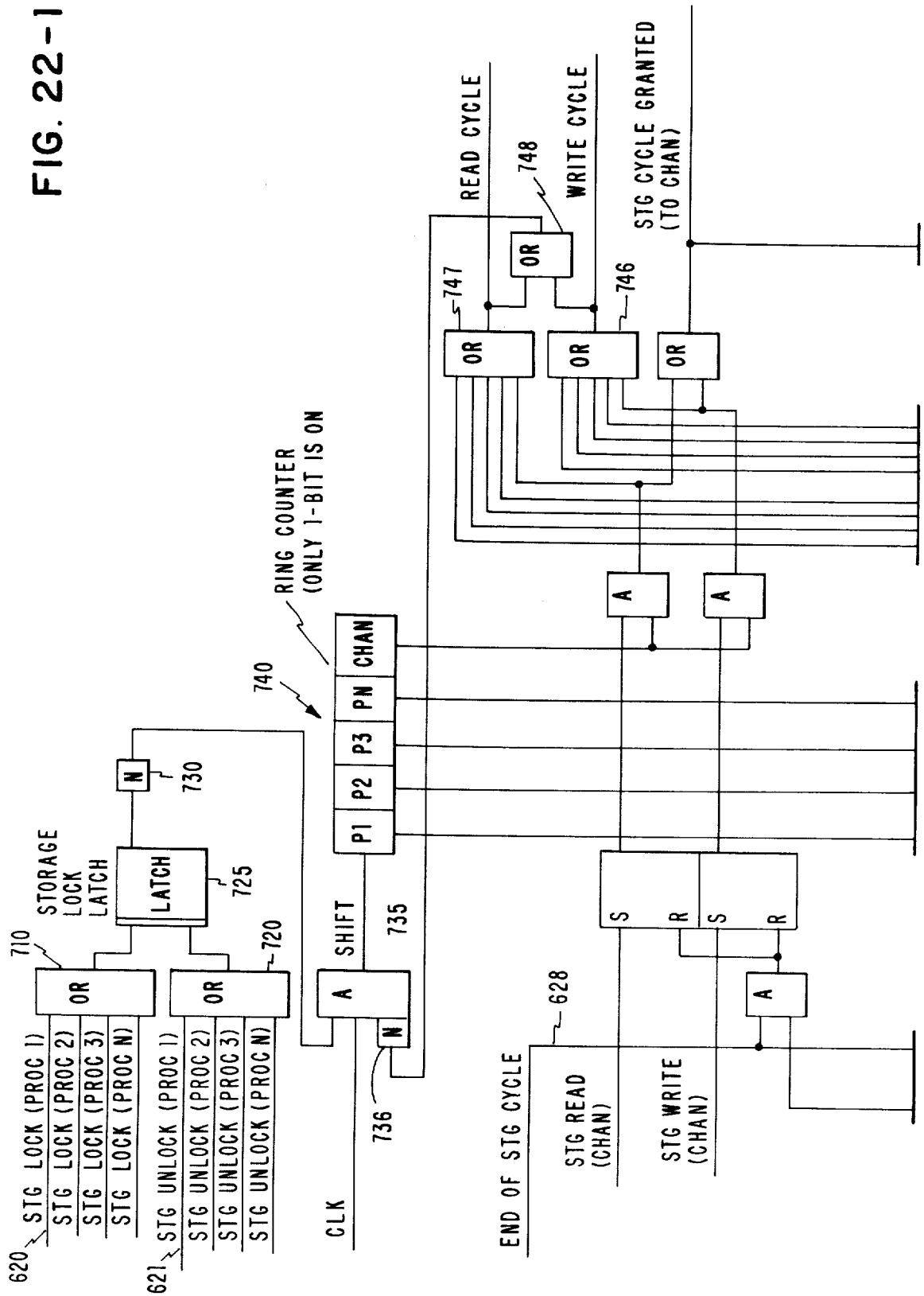
Figures 2, 22:
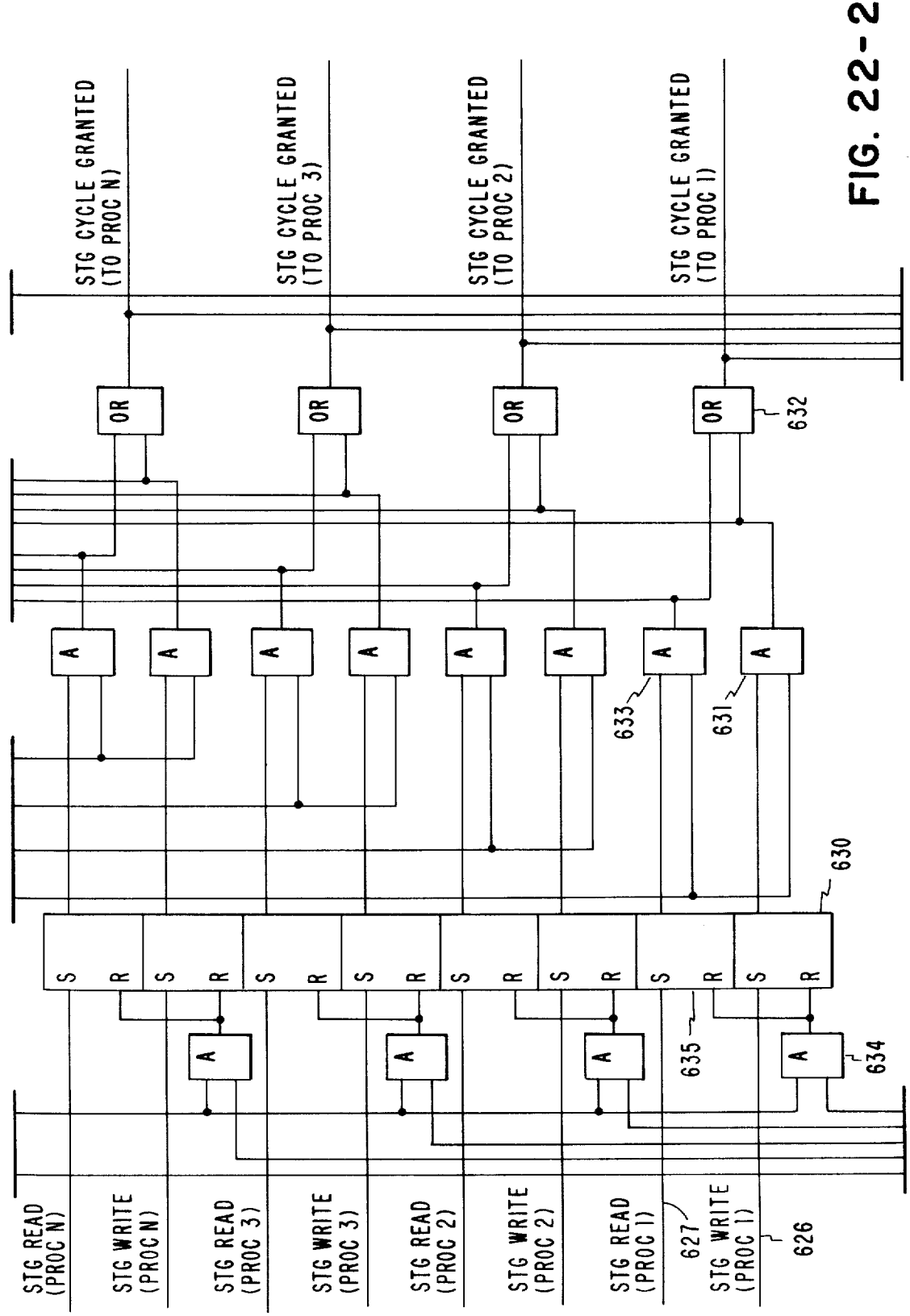
Figures 3, 22:
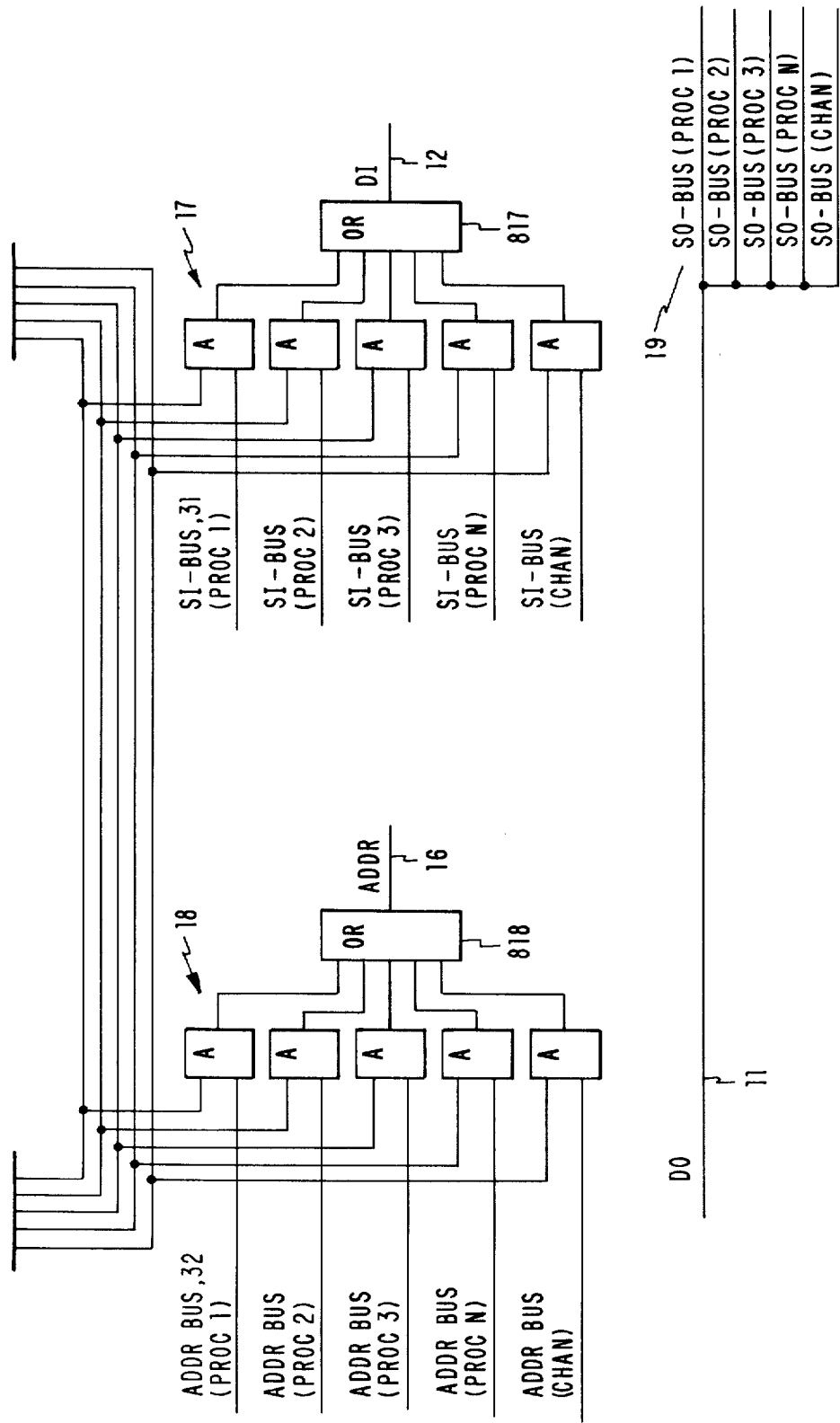

The first operation of the signal receive cycles as shown in FIG. 20, is to decode the request. The request may be to invoke the task dispatcher or it may be some other request. If the request is to invoke the task dispatcher, the signal object (SIG) is unlocked and the task dispatcher is invoked. The particular operations within the central processing unit (CPU) for performing the signal receive cycles is shown in FIG. 21. In order to decode the signal request, the first step is to reset the SR latch 604. The resetting of this latch is performed by the control unit 100 in the same manner that control unit 100 resets the sequence control latches as described in the referenced U.S. Pat. No. 4,177,513. The central processing unit then performs a T1 cycle for setting a value of zero into the signal processor register (SIGP) 605, FIG. 2-2. The T1 CPU cycle is the same as that described in the referenced U.S. Pat. No. 4,177,513 and it functions to gate a constant, and in this instance, a zero value through ALU 45 FIG. 2-1 into the destination register 605. Register 605 is set by bits on the signal lines 606 from other processors which are presenting a request. The contents of the register 605 are compared by compare circuit 608 with the contents of the processor identification register (PID) 607. If the contents of register 607 compare with the contents of register 605, compare circuit 608 generates a signal for setting the SR latch 605. Since the request received is going to be processed at this time, it is necessary to zero out or reset the contents of register 605 and the T1 cycle is taken to accomplish this function.

A T2 cycle is then taken to transfer the contents of SIG @ register 614, FIG. 2-1, into temporary address, T1@, register 615. The T2 CPU cycle is the same as that described in the referenced U.S. Pat. No. 4,177,513 and during the T2 cycle the contents of register 614 are gated through ALU 45 into the destination register 615. The purpose of performing this register transfer is to provide a temporary register to facilitate the increment of the signal object address to enable addressing of the request field in the signal object. The signal object (SIG), as shown in FIG. 3, has the request information in the second byte thereof consequently, to obtain this byte the signal object address must be incremented by one. The A2 CPU cycle is taken to perform the increment by one and is the same as the A2 cycle described in the referenced U.S. Pat. No. 4,177,513. During an A2 CPU cycle the increment value of one and the contents of register 615 are gated to the ALU 45. The ALU 45 performs an add operation and the result, in this instance, is gated into register 615.

A storage read cycle S1 is then taken whereby the contents of register 615 are used to address main storage 10 and the data read from the addressed location is entered into SA register 36. The S1 CPU cycle is the same as that shown and described in the referenced U.S. Pat. No. 4,177,513. An A2 CPU cycle is then taken to decode the value of the request field in the signal object (SIG). The request field of the signal object (SIG) contains an asterisk (*) character if the request is to invoke the task dispatcher. Thus the A2 CPU cycle, in this instance, is performed to subtract an asterisk (*) character, represented in hexidecimal, from the contents of the SA register 36 and the result of the operation is tested by determining if the AZ latch 96, FIG. 2-2, has been set.

Figure 5:
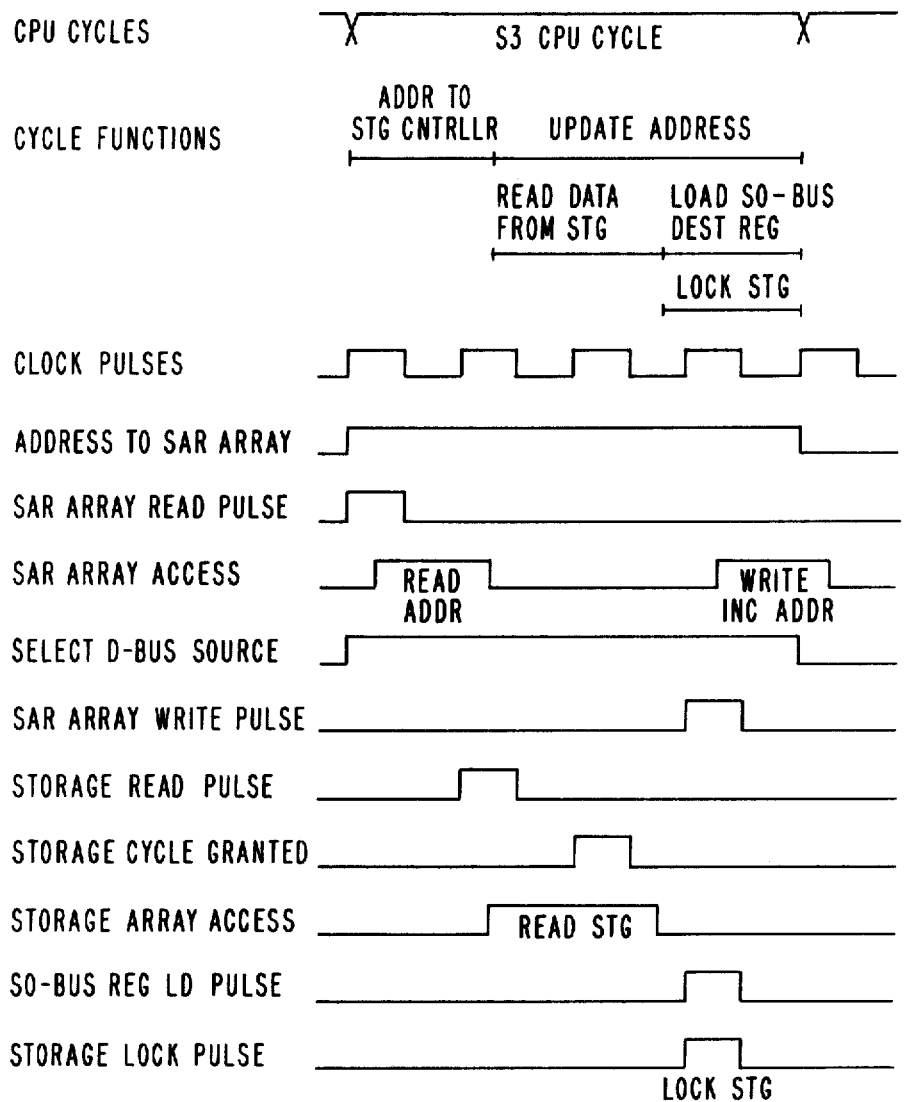
FIG. 5 is a timing diagram for a S3 CPU cycle.

The AZ latch 96 is set when the results of an ALU operation are zero. If the AZ latch 96 were not set as the result of the ALU operation, then the request was for some action other than invoking the task dispatcher. If AZ latch 96 has been set, then an S3 CPU cycle is taken. The S3 CPU cycle is shown in FIG. 5 and it functions to read and lock main storage 10. Main storage 10 is locked during a S3 cycle so as to prevent any other processor from accessing main storage at this time. Thus, while a S1 CPU cycle is for performing a storage read operation and S2 CPU cycle is for performing a storage write operation, as described in the referenced U.S. Pat. No. 4,177,513; the S3 CPU cycle is for performing a storage read and lock operation. In other words, the S3 CPU cycle is a modified S1 CPU cycle. Control unit 100 generates a storage lock pulse as shown in FIG. 5, which is supplied to storage control 15 over line 620, FIGS. 2-1 and 2-2.

Figure 22:
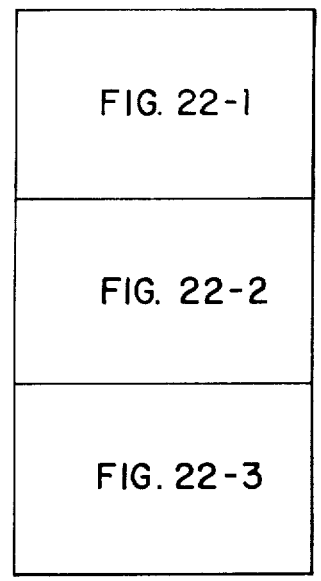
Figures 1, 13:
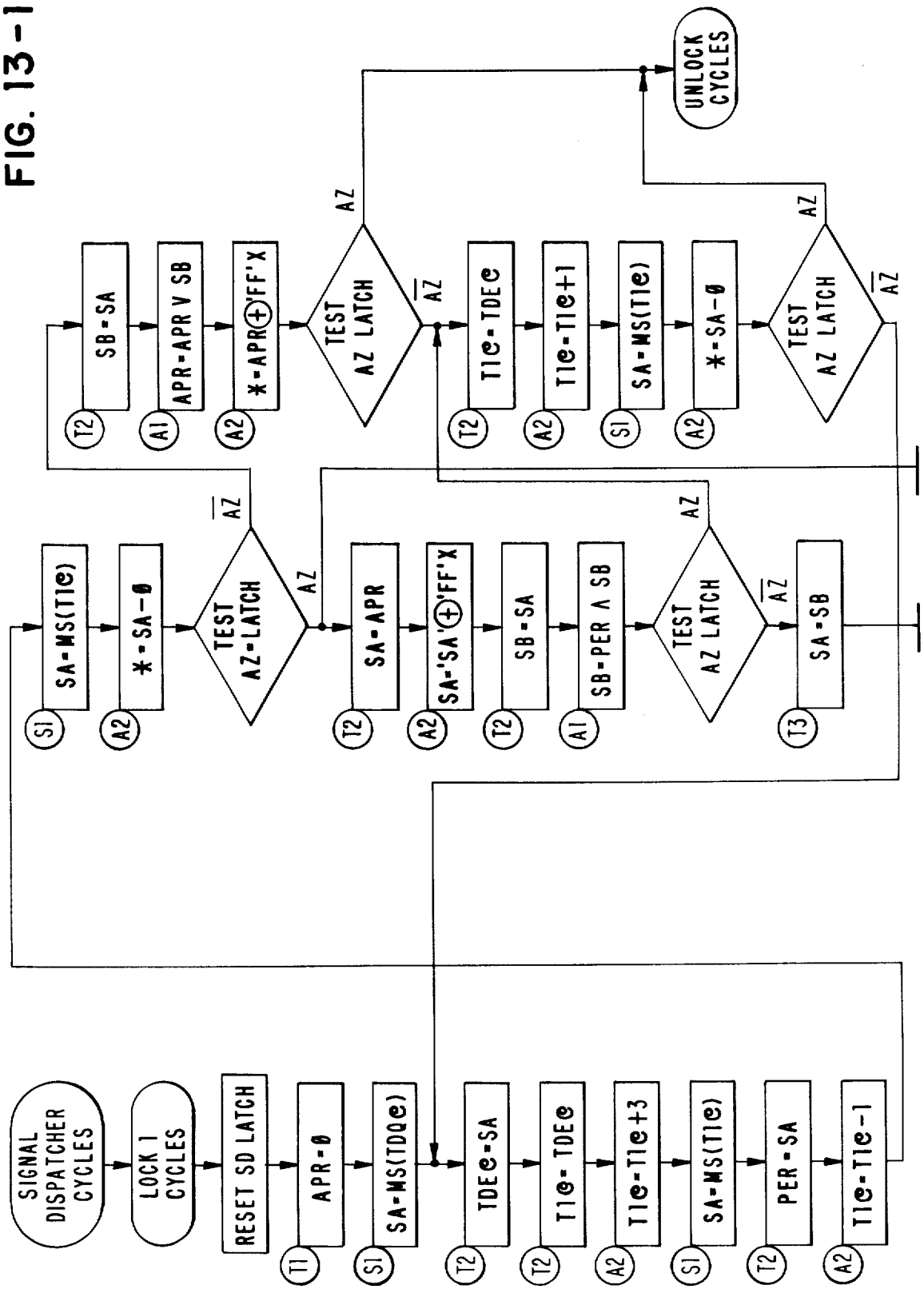
Figures 2, 13:
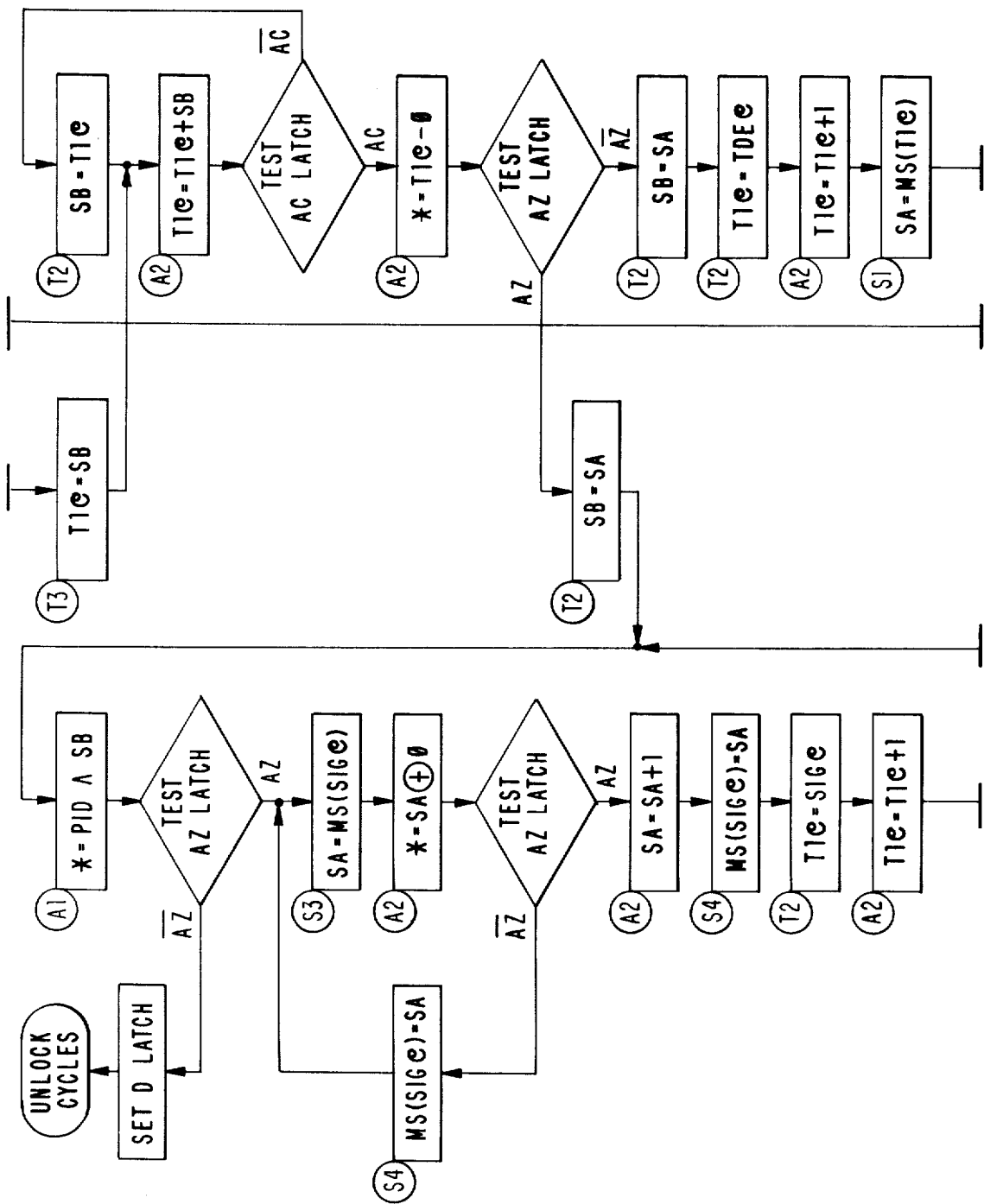
Figures 3, 13:
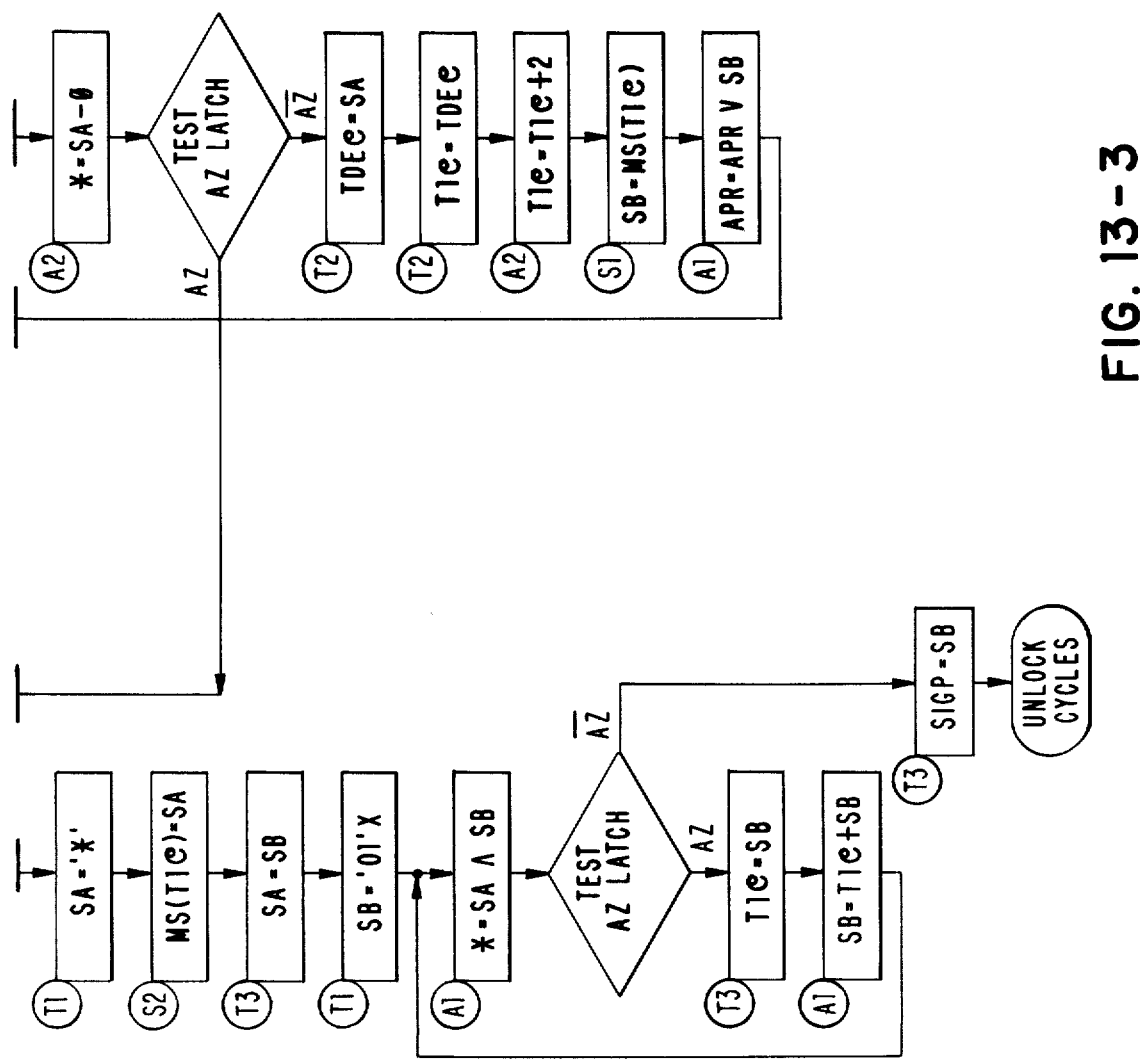

Storage control 15 in the present invention is a modified form of the storage control in the referenced U.S. Pat. No. 4,177,513. The details of storage control 15 are shown in FIG. 22. The storage lock line 620 is an input to logical OR circuit 710 whose output is connected to the set input of latch 725. Latch 725 controls the advancement of shift ring counter 740 for determining which processor is to be granted a storage cycle. The output of latch 725 feeds logical AND circuit 735 via inverter 730. AND circuit 735 also receives an input from inverter 736 and a clock pulse CLK from control unit 100. Inverter 736 functions to indicate when storage 10 is not in a read or write cycle and has its input connected to the output of OR circuit 748 which is fed by OR circuits 746 and 747 where the output of OR circuits 746 and 747 indicate a write cycle and a read cycle respectively. Hence, with latch 725 set, ring 740 can not be advanced and thus no other processor can be granted a storage cycle, read or write, until latch 725 is reset and ring 740 is advanced. The other circuitry in storage control 15 will be described later herein.

Figure 6:
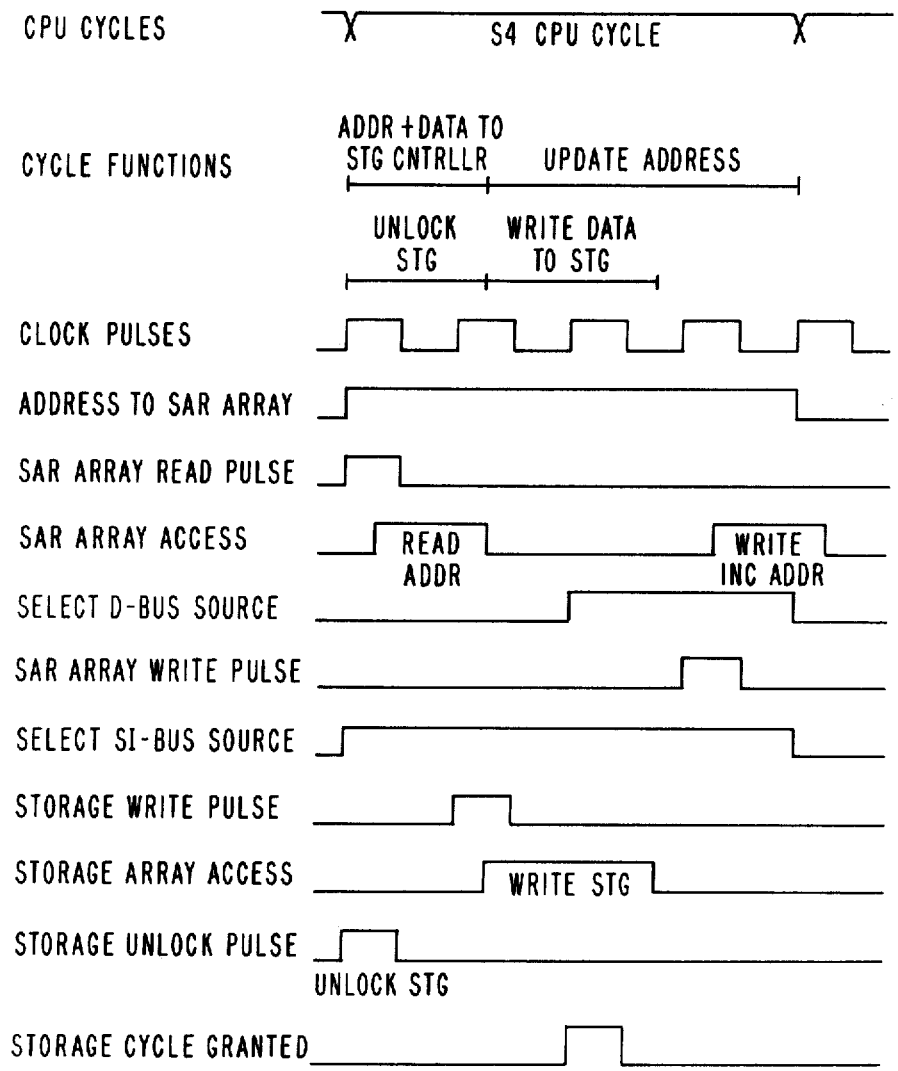
FIG. 6 is a timing diagram of a S4 CPU cycle.

At this time, the function to be performed is to zero out or reset the status field of the signal object (SIG). Hence the S3 CPU cycle is taken to read the status field of the signal object as located by the contents of register 614 and enter the status field into the SA register 36. The address is applied to storage control 15 from register 18, for example, represented by the single AND circuit conditioned by the storage cycle granted signal from OR circuit 632. Register 18 as well as the other address registers in the other processors feed OR circuit 818 which passes an address to main storage 10 via line 16. The data read from main storage 10 passes over bus 11 to feed the buses of the various processors, bus 19, for example. A T1 CPU cycle is then taken to enter a zero value into the SA register 36. A S4 CPU cycle is then taken to unlock storage and write the contents of the SA register, i.e., a zero value into the status field of the signal object. The S4 CPU cycle is shown in FIG. 6 and it is a modified S2 storage write CPU cycle.

During the S4 CPU cycle, control unit 100 generates a storage unlock pulse on line 621 which is supplied to storage control 15. The storage unlock pulse on line 621 is passed by OR circuit 720, FIG. 22, to reset latch 725. As seen in FIG. 6, the storage unlock pulse occurs first in the S4 CPU cycle and then the storage write pulse occurs. Thus, during the S4 CPU cycle, the address of the signal object in register 614, FIG. 2-1, is used to address main storage 10 and the zero value in SA register 36 is passed via bus 31, for example, to register 17 as represented by the single AND circuit in FIG. 22, and passed from register 17 via OR circuit 817 over bus 12 to be written into the addressed location. The storage write pulse on line 626, FIG. 22, sets latch 630 and its set output conditions AND circuit 631 whereby AND circuit 631 passes a storage cycle granted signal via OR circuit 632 when the active position of ring 740 is the one whose output feeds AND circuit 631. The OR circuit 632 is also fed by AND circuit 633. AND circuit 633 is connected to ring 740 in the same manner as AND circuit 631 and is conditioned by the output of latch 635 which is set by a storage read signal on line 627. Latches 630 and 635 are reset under control of AND circuit 634 which is conditioned by the output of OR circuit 632 and receives an end of storage cycle signal on line 628 which is then passed to reset either latch 630 or 635. The end of storage cycle signal on line 628 is generated by main storage 10 in the conventional manner. Control unit 100 and then sets D latch 93 of the sequence control latches and the operation switches to I-Fetch cycles in a manner as described in the referenced application Ser. No. 4,177,513.

Figure 8:
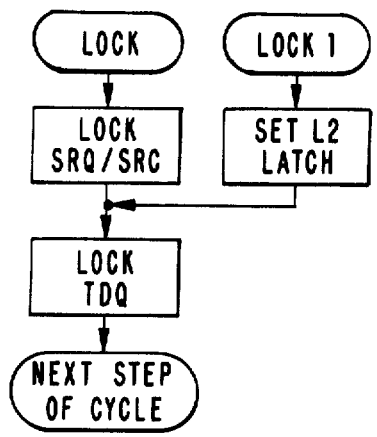
FIG. 8 is a flow diagram illustrating lock cycles.
Figure 10:
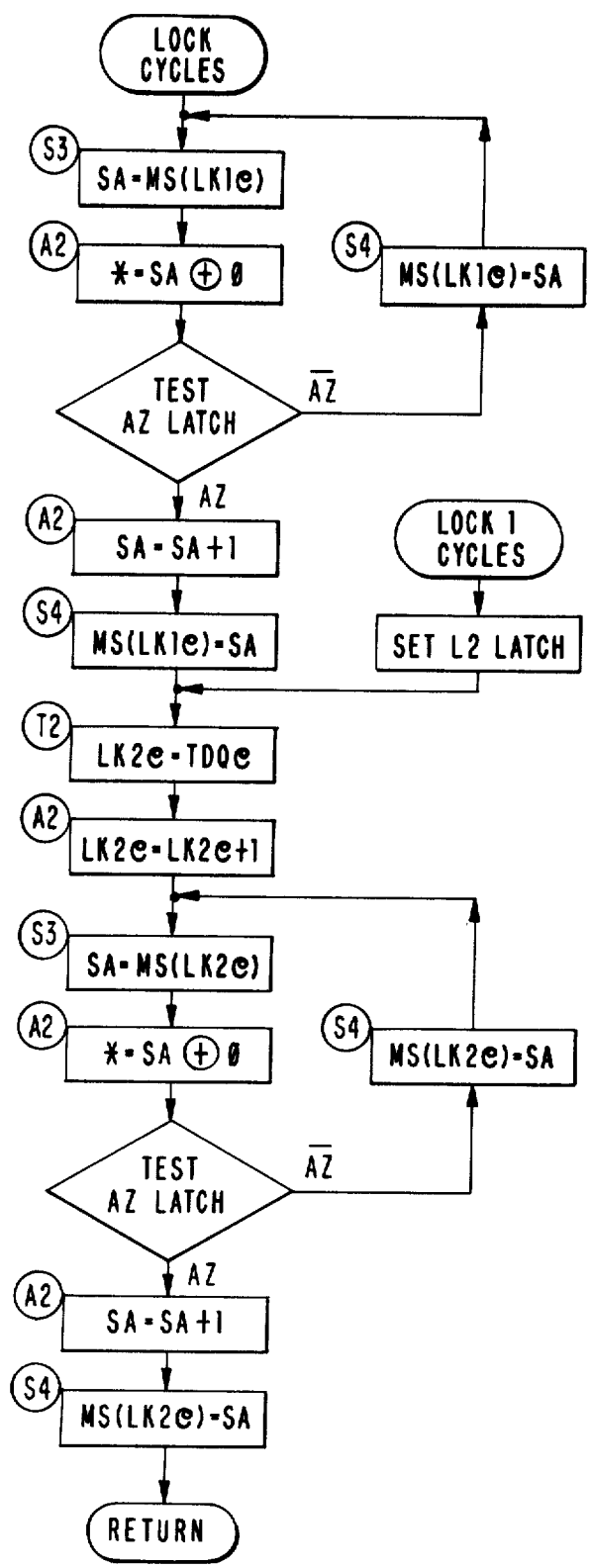
FIG. 10 is a flow diagram illustrating the CPU cycles for the lock cycles.
Figure 15:
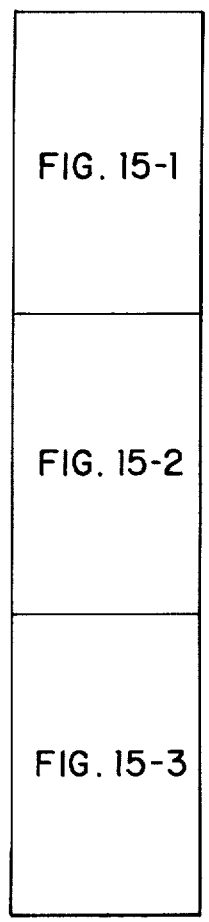
Figure 14:
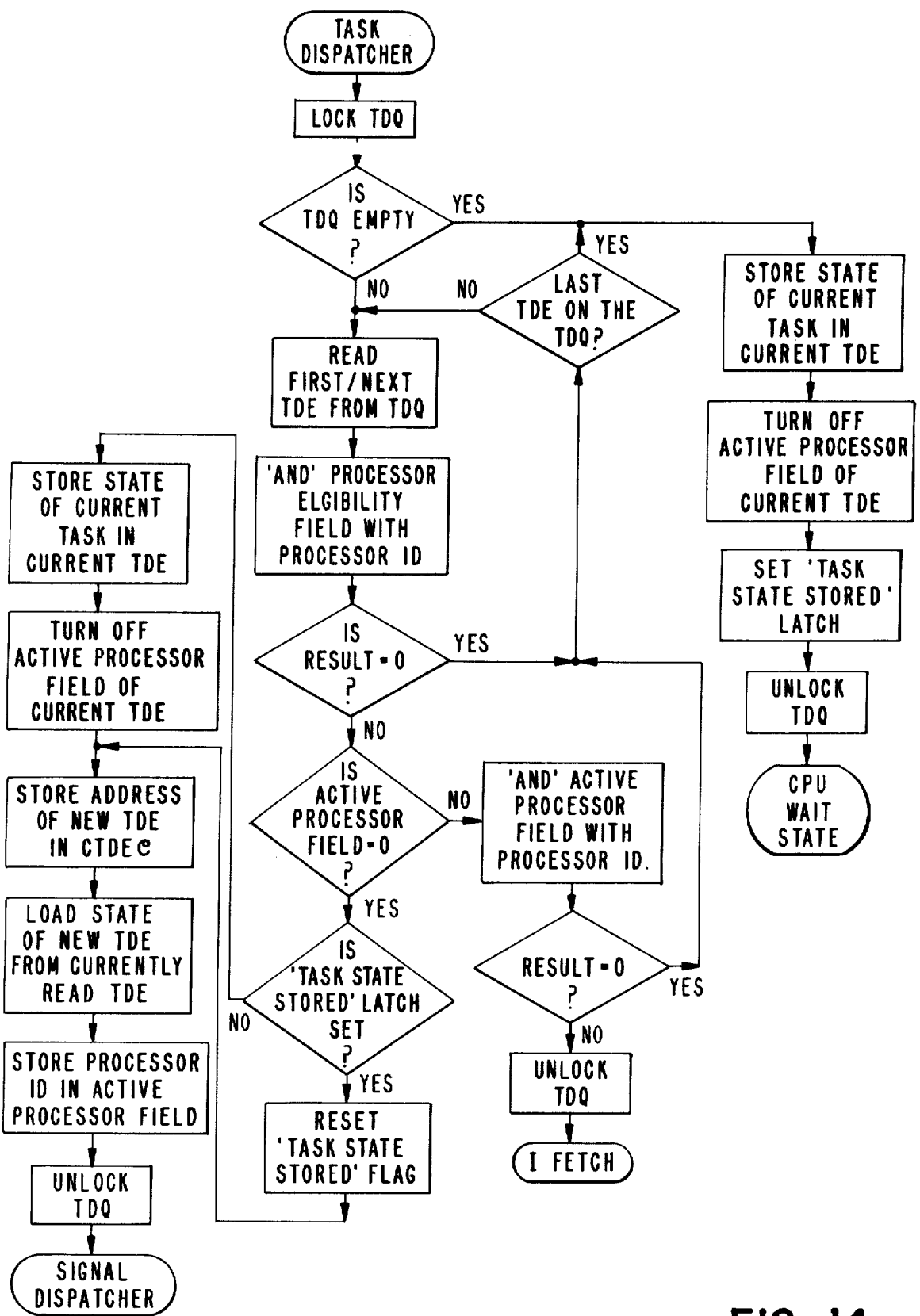
FIG. 14 is a flow diagram of the task dispatcher.
Figures 1, 15:
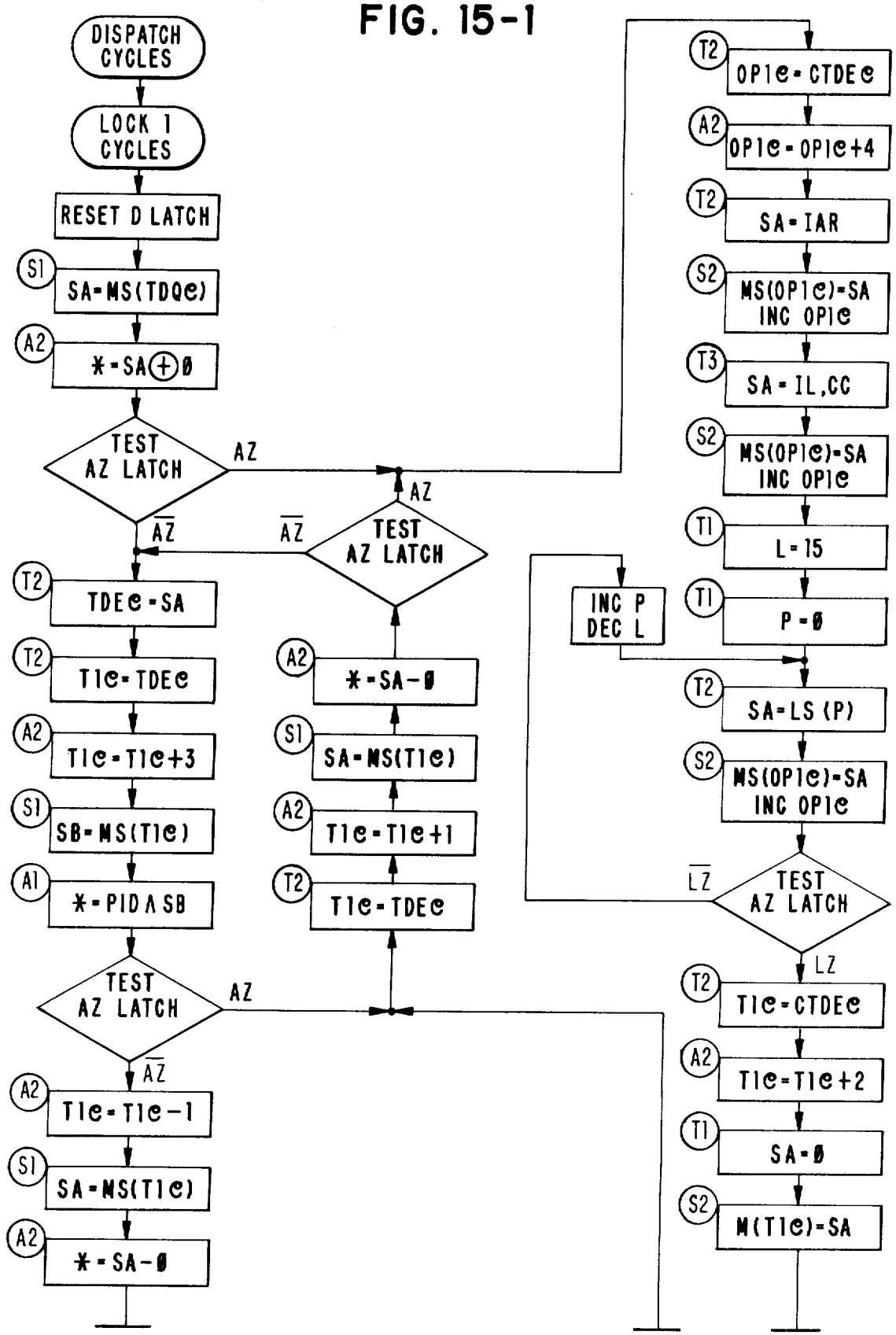
Figures 2, 15:
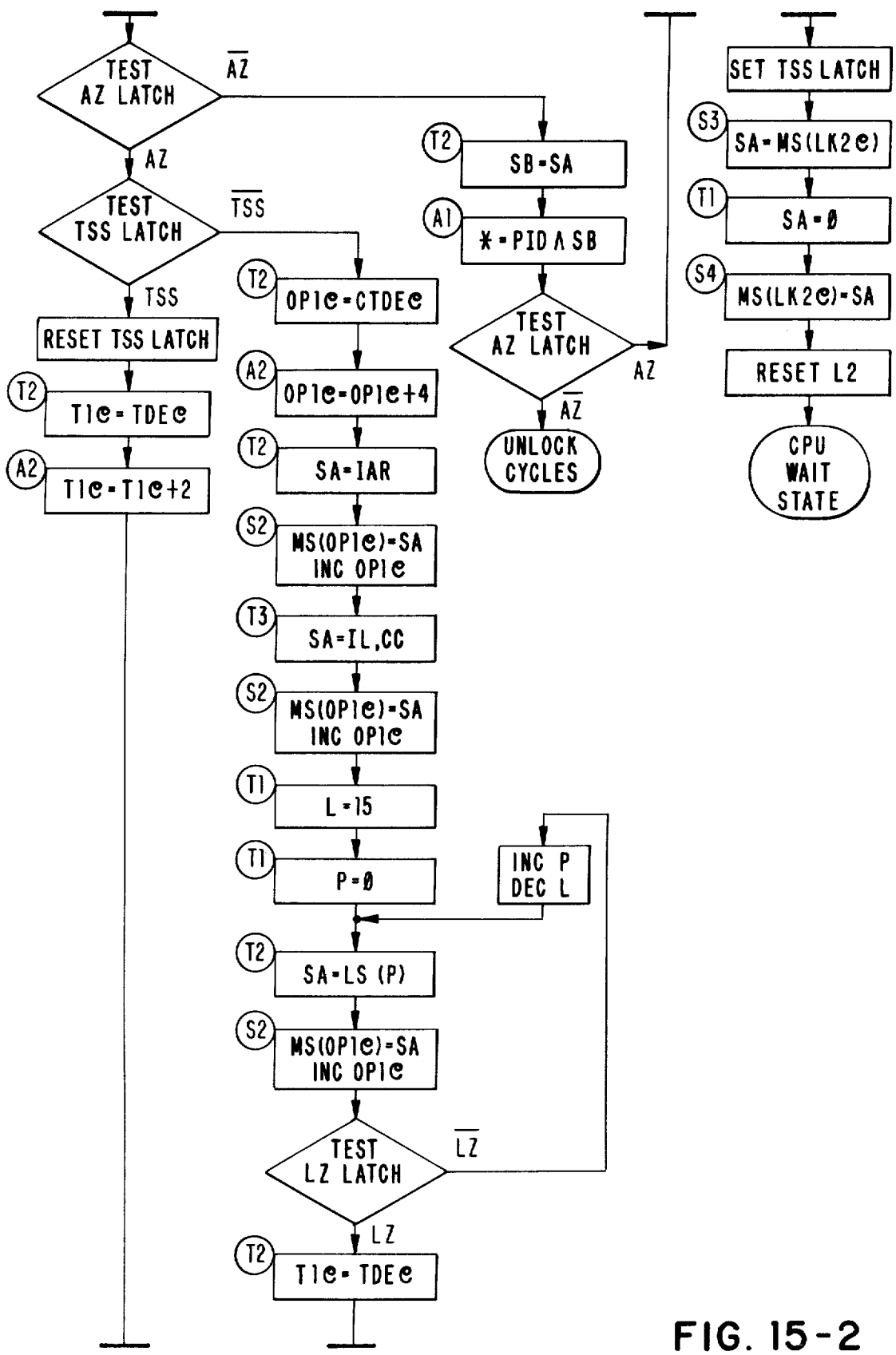
Figures 3, 15:
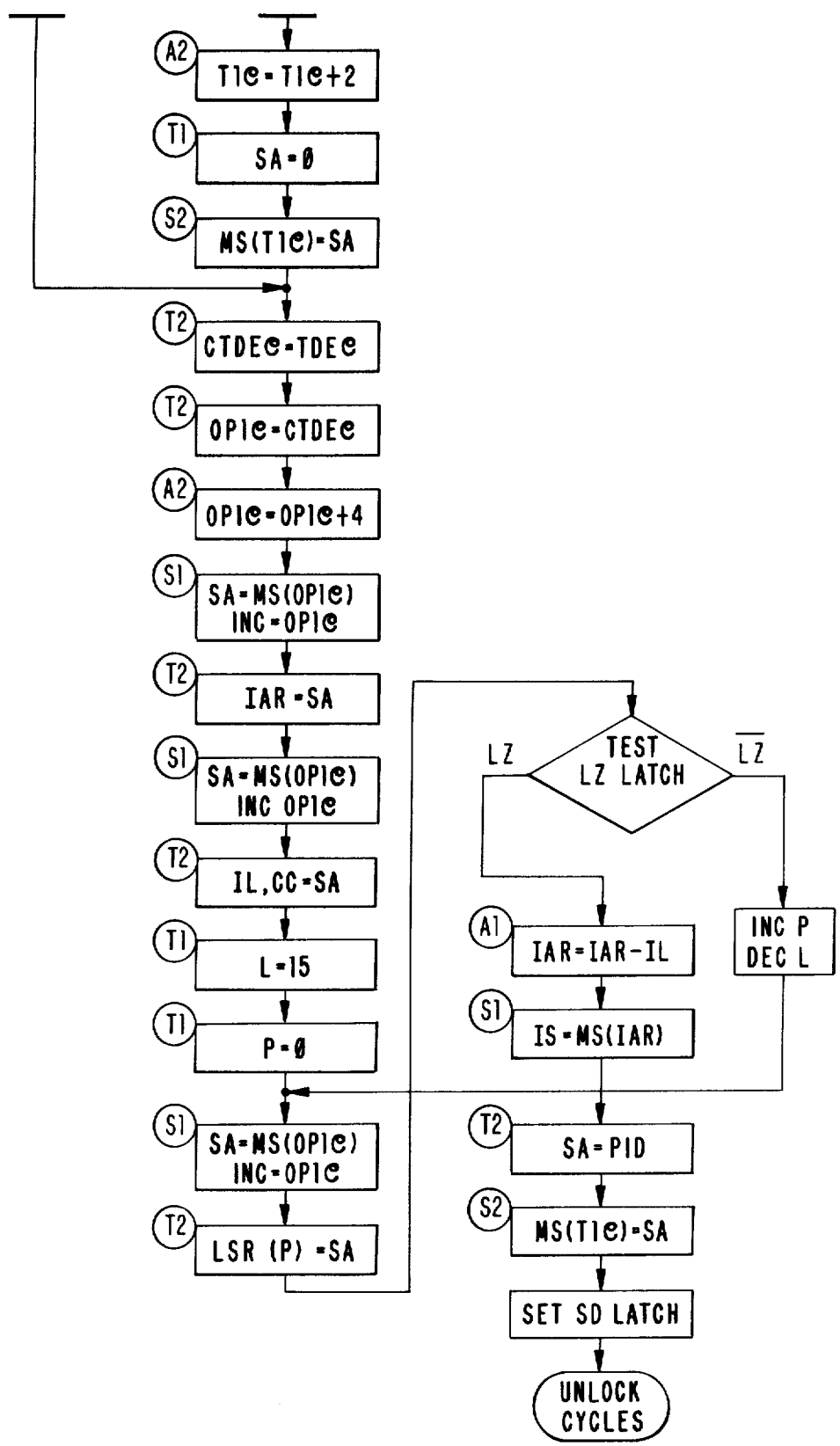

During the decode of the sequence control latches IO, SR, D and SD of the I-fetch cycles, the set state of D latch 93 is detected and the operation switches to dispatch cycles. A flow diagram of the task dispatcher is set forth in FIG. 14. The first operation to take place is to lock the TDQ. This operation, as shown in FIG. 15-1, is accomplished by lock 1 cycles. The lock 1 cycles are shown in FIGS. 8 and 10 and will be described later herein. The function of the lock 1 cycles, of course, is to lock the TDQ and thereby restrict access of the TDQ to the task dispatcher of the CPU which was signaled to invoke its task dispatcher. A test is then made to determine if the TDQ is empty. If the TDQ is not empty, the first TDE is read from the TDQ. The processor eligibility (PE) field in the TDE is logically ANDed with the processor ID and a test is made to determine if the result is zero. If the result is not zero, a test is made to determine if the active processor field in the TDE is equal to zero. If the active processor field is equal to zero, a test is made to determined if the task state stored (TSS) latch 609 is set. If the task state stored (TSS) latch 609 is not set, the state of the current task in the current TDE is stored and the active processor field of the current TDE is turned off. If the task state stored (TSS) latch 609 is set, then it is reset and the next operation is to store the address of the new TDE in the current TDE address register 53 of FIG. 2-1. This step is followed by loading the state of the new task from the currently read TDE and then storing the processor ID in the active processor field. The TDQ is then unlocked and an exit is taken to the signal dispatcher.

The signal dispatcher functions to determine if the previous current TDE, i.e., the task which had been running before the task switch, can be run on some other processor. The operation of the signal dispatcher will be described later herein. The path which is taken if the TDQ is empty will now be described. If the TDQ is empty, then the state of the current task is stored in the current TDE and the active processor field of the current TDE is turned off. The task state stored (TSS) latch 609 is set, the TDQ is unlocked and the CPU or processor enters a wait state.

Figure 9:
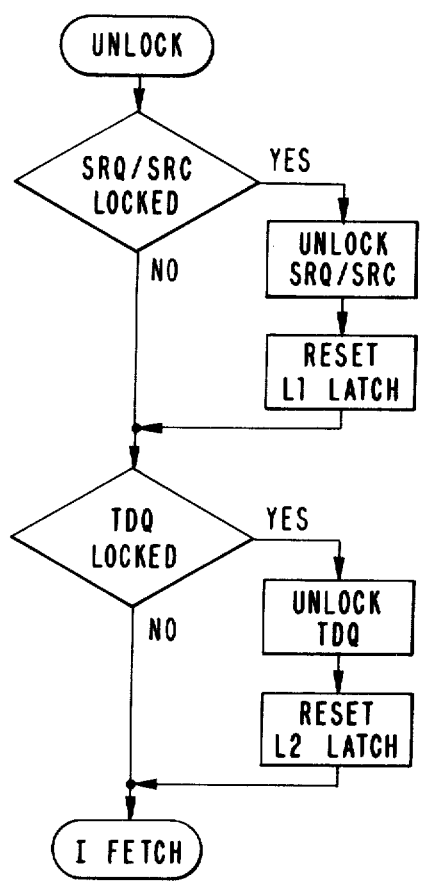
FIG. 9 is a flow diagram illustrating unlock cycles.

If the TDQ had not been empty and the processor signaled to invoke its task dispatcher was not eligible to process the TDE read from the TDQ, a test is then made to determine if the TDE is the last TDE on the TDQ. If it is not, then the next TDE is read from the TDQ and it is checked to determine if it is eligible to run on that processor. If that TDE is eligible to run on that processor but the active processor field is not zero, then the active processor field is logically ANDed with the processor ID. A test of the result from the logical AND operation is then made and if the result is zero, a test is made to determine if that TDE is the last TDE on the TDQ. If the result is not zero, unlock cycles shown in FIG. 9 are taken to unlock the TDQ and the next sequential instruction is fetched by I-fetch cycles.

The dispatch cycles are shown in detail in FIGS. 15-1, 15-2 and 15-3. It is seen that the dispatch cycles begin with the lock 1 cycles shown in FIGS. 8 and 10. The lock 1 cycles are taken to lock the TDQ. In FIG. 8 it is seen that the first operation of the lock 1 cycle is to set L2 latch 602 in FIG. 2-2. The L2 latch 602 controls the locking and unlocking of the TDQ. When L2 latch 602 is set, the TDQ is then locked, and the operation switches to the next step of the dispatch cycles which is to reset the D latch 93 in FIG. 2-2.

The lock 1 cycles are shown in greater detail in FIG. 10 where after setting the L2 latch 602, a T2 CPU cycle is taken for loading the TDQ address into lock 2 address, LK2@, register 612 in SAR array 50. An A2 CPU cycle is then taken to increment the contents of register 612 by one. This is followed by a S3 CPU cycle for reading main storage 10 at the location addressed by the address in register 612 and entering the data read from main storage 10 into SA register 36. Main storage 10 is then locked during the S3 CPU cycle. An A2 CPU cycle is then taken to exclusive OR the contents of SA register 36 with zero and a test is then made to determine if the AZ latch 96 is zero. This operation tests the status byte in the TDQ object to determine if the TDQ is busy. The TDQ is not busy if the status byte is zero, but is busy if it is other than zero. Thus if AZ latch 96 is not set and thereby indicates that the status byte is not zero, a S4 CPU cycle is taken to unlock main storage and write the contents of the SA register 36 into main storage 10 at the location specified by the address in register 612. If the status byte of the TDQ object is zero, i.e., the AZ latch 96 is set, then an A2 cycle is taken to increment the contents of the SA register by one whereby the status byte has a value to indicate that the TDQ is busy. A S4 CPU cycle is then taken to unlock main storage and to store the contents of register 612 in main storage 10. The operation then returns to the dispatch cycle shown in FIG. 15-1 and the D latch 93 is reset.

The next step is similar to the next step of the dispatch cycles shown and described in the referenced patent 4,177,513 and that is to determine if the TDQ is empty or if it has some TDEs enqueued thereon. This is accomplished by performing a S1 CPU cycle where the TDQ address is read from main storage 10 and entered into the SA register 36. The S1 CPU cycle is followed by an A2 CPU cycle where the contents of register 36 are exclusive ORed with zero. The AZ latch 96 is set when the TDQ is empty. If the AZ latch 96 is not set as a result of the A2 CPU cycle, then a T2 CPU cycle is taken to transfer the contents of SA register 36 into a TDE address register 616 to store the TDE address therein. Another T2 CPU cycle is then taken to transfer the TDE address from register 616 into temporary register 615. The TDE address in temporary register 615 is then incremented by three during an A2 CPU cycle and the result is stored back into the temporary register 615. The incremented address is then used during a S1 CPU cycle to address main storage 10 and the contents read therefrom are entered into SB register 37. Thus by this operation the processor eligibility field of the TDE is read into register 37. An A1 CPU cycle is then taken to AND the contents of the processor ID register, i.e.

register 607, with the processor eligibility field from register 37. A test is then made to see if the AZ latch 96 had been set as a result of the logical AND operation performed during that A1 CPU cycle.

If the AZ latch 96 is set, then the processor performing the dispatch cycles is not eligible to run the particular task. If the AZ latch 96 is not set, the processor is eligible to run the task and an A2 CPU cycle is taken to decrement by one the address held in register 615 so as to provide an address for addressing the active processor (AP) field of the TDE. The address is then taken from register 615 during a S1 CPU cycle to address main storage and read the active processor (AP) field from the TDE into SA register 36. This is followed by an A2 CPU cycle for determining if the active processor (AP) field is zero, i.e., the value zero is subtracted from the contents of SA register 36. A test is then made to see if the AZ latch was set as a result of this arithmetic operation. If the AZ latch 96 was not set, it is an indication that some processor of the multiprocessor system is executing the task. A test is then made to determine if the processor performing the dispatch cycles is executing the task. This is accomplished by executing a T2 CPU cycle to transfer the contents of SA register 36 into SB register 37. This is followed by an A1 CPU cycle where the processor identification field in register 607 is logically ANDed with the contents of SB register 37. If the AZ latch 96 is set as a result of this logical operation, it is an indiciation that some other processor is executing that particular task but if the AZ latch 96 is not set, then unlock cycles are taken to unlock the TDQ. The unlock cycles will be described later herein.

Assuming that the AZ latch 96 had been set, i.e., some other processor is executing the task, or if the processor performing the dispatch cycles was not eligible to run this particular task, then it is necessary to determine if the TDE is the last TDE on the TDQ. This is because if it is not the last TDE on the TDQ then the next TDE can be examined to determine if it can be dispatched. Thus, a T2 cycle is taken to transfer the TDE address from register 616 into register 615. This is followed by an A2 cycle for incrementing the address in register 614 by one. The incremented address is then used during a S1 cycle to fetch the TDE chain address from main storage and enter in into SA register 36. The TDE chain address is then tested to determine if it is zero and this is accomplished by an A2 CPU cycle where a value of zero is subtracted from the contents of SA register 36. A test is then made of the AZ latch 96 and if it is set, then the TDE is the last TDE on the TDQ. If the AZ latch is not set, then there are more TDEs on the TDQ and the next TDE will be examined by looping back to the T2 CPU cycle which was previously described for transferring the contents of SA register 36 into TDE address register 616.

Before describing the examination of the next TDE, the action taken when the TDQ is empty or the TDE which had been examined is the last TDE on the TDQ will be described. When the TDQ is empty or the TDE which had been examined is the last TDE on the TDQ, then the state of the task which the processor had been executing prior to entering the dispatch cycles is stored and that processor enters the wait state. This action is accomplished by first performing a T2 CPU cycle where the current TDE address in register 53 is transferred into OP1 address register 54. An A2 CPU cycle is then taken to increment the current TDE address by four and return the incremented value to the OP1 address register 54. A T2 CPU cycle is then taken to transfer the contents of IAR register 51 into SA register 36. A S2 cycle is then taken to write the contents of SA register 36 into main storage 10 at the location addressed by the contents of OP1 address register 54 and the contents of that register are incremented during the S2 cycle.

A T3 CPU cycle is then taken to transfer the contents of IL register 38 and condition code (CC) latches 65 into SA register 36. The contents of SA register 36 are then written into main storage during a S2 CPU cycle. A value of 15 is then emitted into length register 66 during a T1 CPU cycle and this is followed by another T1 CPU cycle where P register 90 is set to a value of zero. A T2 CPU cycle is then taken to transfer the contents of base register O of local storage registers 70, as pointed to by the data in P register 90, into SA register 36. The contents of register 36 are then written into main storage 10 during a S2 CPU cycle and the address in OP1 address register 54 is incremented. The LZ latch 89 is then tested to see if the contents of L register 66 have gone to zero. This action is the same as the described in the reference U.S. Pat. No. 4,177,513, i.e., the LZ latch 89 will not be set at this time and the contents of P register 90 are incremented and the contents of L register 66 are decremented.

Eventually the value of 15 in L register 66 will have been decremented to zero whereby LZ latch 89 is set and a T2 CPU cycle will be taken to transfer the current TDE address in register 53 into temporary register 615. The current TDE address will then be incremented by two during an A2 CPU cycle. A T1 CPU cycle is then taken to enter a value of zero into the SA register 36. This is followed by a S2 CPU cycle where the contents of the SA register 36 are written into main storage 10 at a location designated by the address in temporary register 615. Control unit 100 then sets task state stored (TSS) latch 609. This action is followed by a S3 CPU cycle to perform a main storage read operation to read data therefrom at the location specified by the address in register 612, enter the data into SA register 36 and lock main storage. The data in register 36 is then set to zero by a T1 CPU cycle where a zero value is entered into SA register 36. The zero value in register 36 is then written into main storage during a S4 CPU cycle at the location specified by the address in register 612 and storage is unlocked. Control unit 100 then resets the L2 latch 602 and the processor performing the dispatch cycles enters a wait state.

During dispatch cycles, if the active processor field had been equal to zero, then a test is made as shown in FIG. 15-2 to determine if the task state stored (TSS) latch 609 is set. If the task state stored latch 609 is not set, then action is taken to store the state of the task in the manner described earlier herein. Additionally, after storing the state of the task, the active processor field of the current TDE is turned off and this is accomplished by transferring the contents of TDE address register 616 into temporary register 615 during a T2 CPU cycle. An A2 CPU cycle is then taken to increment the address in temporary register 615 by two. A T1 CPU is then taken to enter a value of zero into SA register 36. This cycle is followed by a S2 CPU cycle where the zero value in SA register 36 is written into main storage at a location specified by the address in the temporary address register 615. Had the task state store latch 609 been on at the testing thereof, it would have been reset by control unit 100 and a T2 CPU cycle would then follow for transferring the contents of TDE address register 616 to temporary register 615. The address in temporary register 615 would then be incremented by two during an A2 CPU cycle.

The next action to take place would be to load the state of the new task from the current TDE. This would be accomplished in the same manner as described in the referenced U.S. Pat. No. 4,177,513 by taking a T2 CPU cycle to transfer the TDE address from register 616 into the current TDE address register 52. Then a series of CPU cycles as described in the referenced U.S. Pat. No. 4,177,513 would be taken to load the state of the new task from the currently read TDE into the LSR registers 70 of the processor and the IAR SAR51 would be set to point to the first instruction of the task. The first instruction is then prefetched into IS register 35 during a S1 cycle. After this had been completed, a T2 CPU cycle will be taken to transfer the processor ID from register 607 into SA register 36. A S2 CPU cycle is then taken to store the processor ID into the active processor field of the new TDE by writing the contents of the SA register 36 into main storage 10 at the address specified by the contents of register 615. The SD latch 603 is set and unlock cycles are taken.

Figure 11:
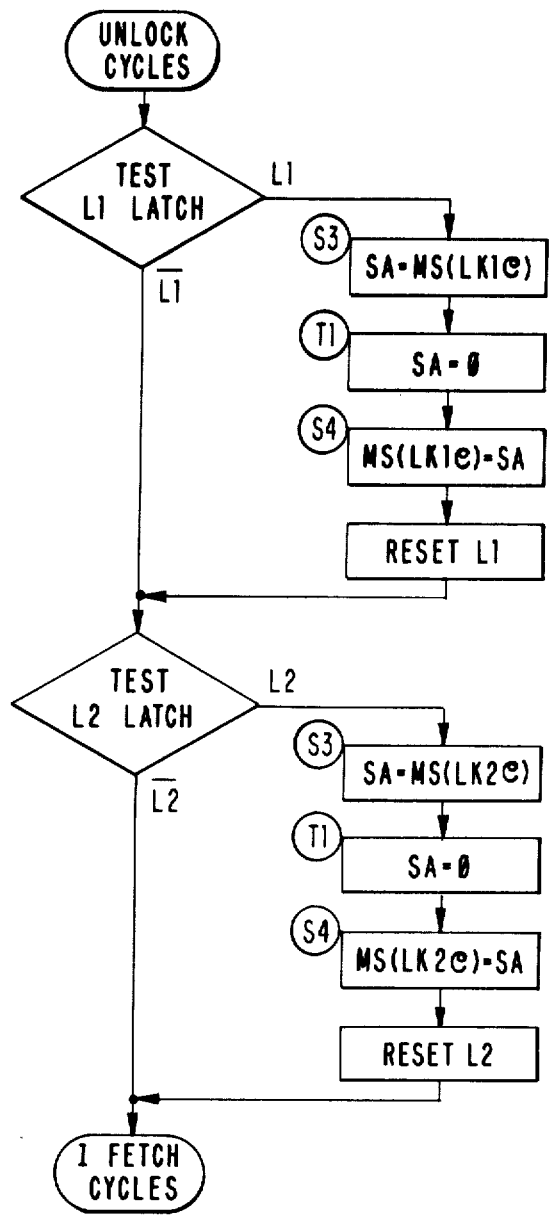
FIG. 11 is a flow diagram illustrating the CPU cycles for the unlock cycles.

The unlock cycles are shown in FIGS. 9 and 11. The first step of the unlock cycles is to determine if a send-/receive queue or a send/receive counter is locked. Send/receive queues (SRQs) and send/receive counters (SRCs) are described in the referenced U.S. Pat. No. 4,177,153. If either a send/receive queue or a send-/receive counter is locked, then it is unlocked by resetting the L1 latch 601, FIG. 2-2. A test is then made to determine if the TDQ is locked. This latter test would also have been made if neither a send/receive queue or send/receive counter had been locked. If the TDQ is not locked the operation proceeds to I-fetch cycles whereas if it is locked, it is unlocked by resetting the L2 latch 602, FIG. 2-2.

The detailed operation of the unlock cycles are shown in FIG. 11 where the first step is to test the state of the L1 latch 601. If the L1 latch is set, a S3 CPU cycle is taken to read main storage 10 at the address specified by the contents of LK1@ register 611 and transfer the data read from main storage 10 into SA register 36. The contents of SA register 36 are then set to zero during a T1 CPU cycle. The zero value in SA register 36 is then written into main storage 10 at the address specified by the contents of LK1@ register 611 during a S4 CPU cycle and the L1 latch 601 is reset.

If the L1 latch 601 was already in the reset state or after it had been reset, then the state of the L2 latch 602 is tested by control unit 100. If L2 latch 602 is set, thereby indicating that the TDQ is locked, a S3 CPU cycle is taken to read main storage 10 at the address specified by the contents of LK2@ register 612 and the data read from main storage 10 is entered into SA register 36. A T1 CPU cycle is then taken to enter a zero value into SA register 36. The zero value in SA register 36 is then written into main storage 10 during a S4 CPU cycle at the address specified by the contents of LK2@ register 612. The L2 latch 602 is then reset and the operation switches to I-fetch cycles which would also have been switched to if the L2 latch 602 had already been in the reset state.

Figures 1, 12:
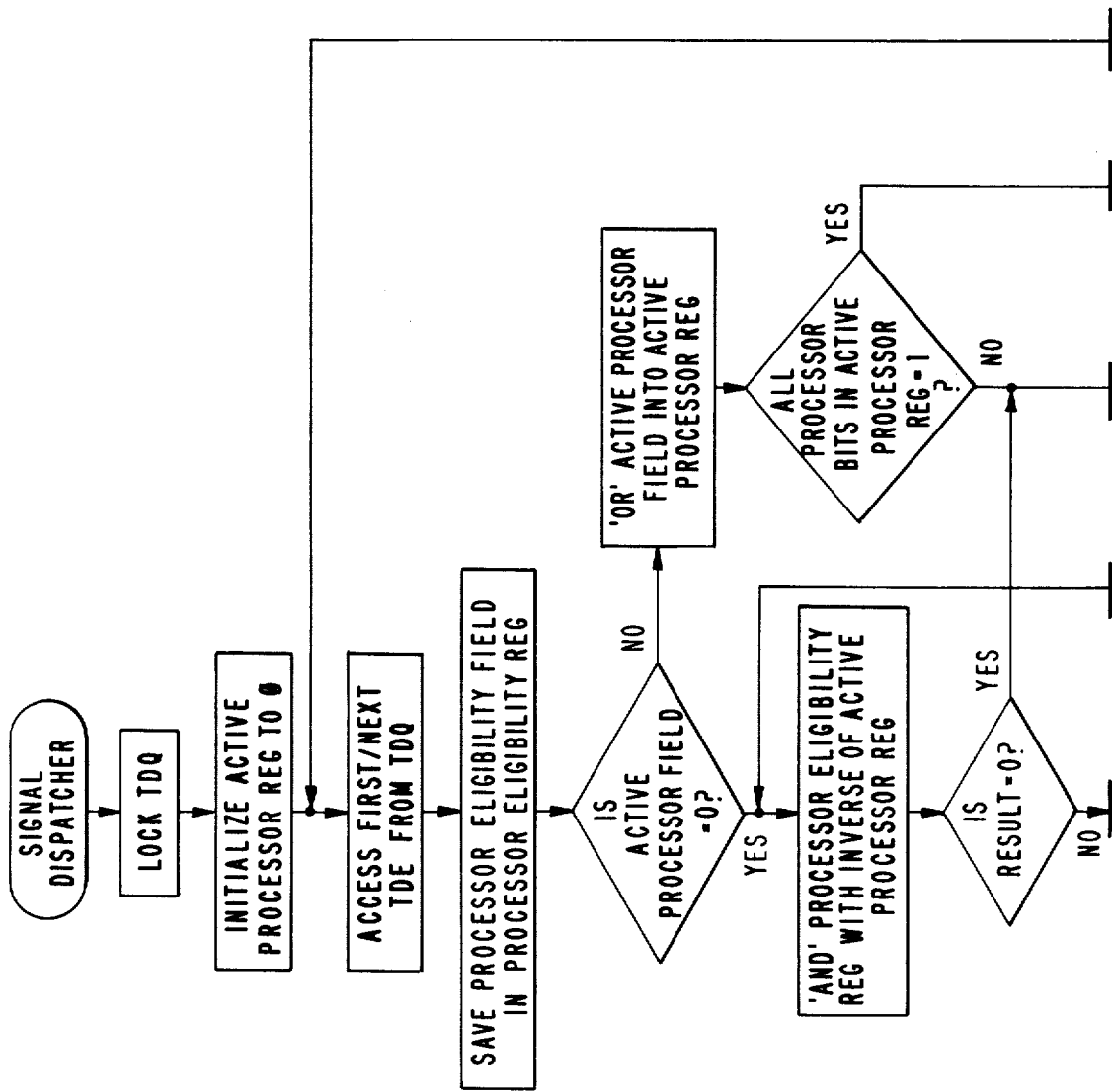
Figures 2, 12:
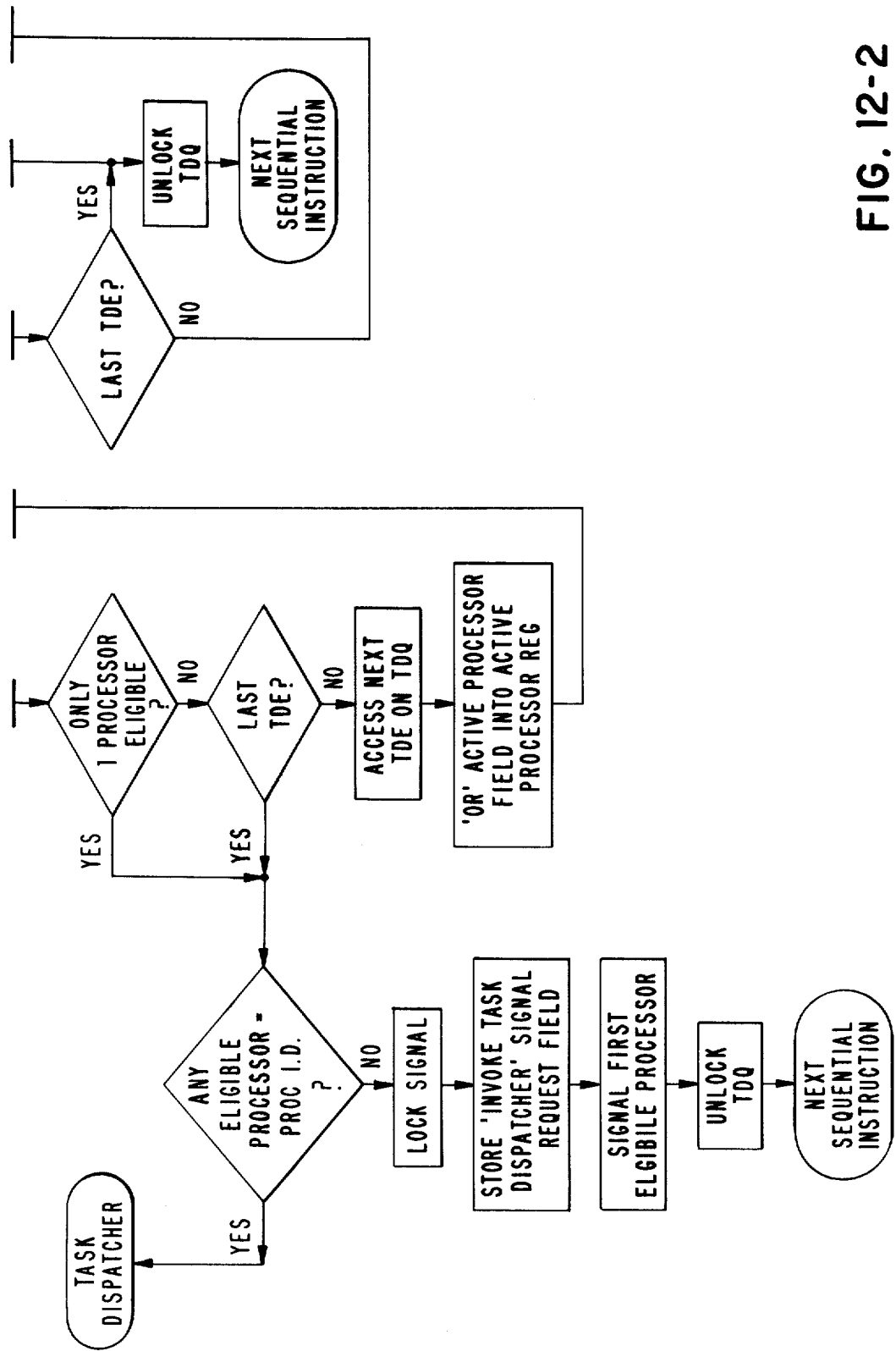
Figure 13:
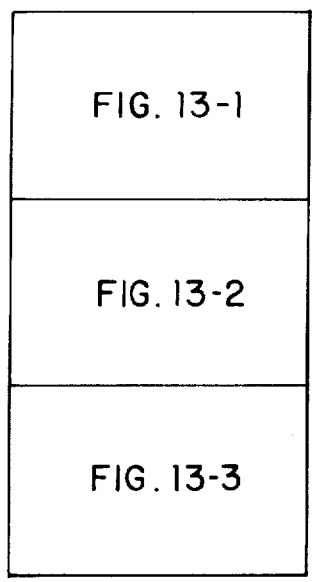

During the decode step of I-fetch cycles which have been entered after leaving the unlock cycles, the SD latch 603 would be decoded as being on because it was set just before the unlock cycles were entered. Then if I/O, SR, and D latches 94, 604 and 93 respectively were in the reset state, signal dipatcher cycles would be entered. It will be recalled that any processor which runs its task dispatcher must follow this operation by running its signal dispatcher. The logic of the signal dispatcher is set forth in FIG. 12 and the signal dispatcher cycles are shown in FIGS. 13-1 and 13-2. With reference to these figures, the first step taken during signal dispatcher cycles it to lock the TDQ by performing lock 1 cycles which have been previously described. This is followed by resetting the SD latch 603; this being accomplished by control unit 100. The active processor register (APR) 610 is initialized to a zero value through the facility of a T1 CPU cycle. A S1 CPU cycle is then taken to read the contents of main storage 10 at a location specified by the TDQ address into SA register 36. The contents of SA register 36 are then transferred during a T2 CPU cycle into TDE address register 616. The value in the TDE address register 616 is then transferred during another T2 CPU cycle to temporary (T1@) register 615. The two T2 CPU cycles effectively access the first or next TDE from the TDQ.

The next operation is to save the processor eligibility field in the processor eligibility register 613. This is accomplished by a series of CPU cycles starting with an A2 CPU cycle followed by S1 and T2 CPU cycles. During the A2 CPU cycle, the contents of temporary (T1@) register 615 are incremented by three. Main storage 10 is then read during the S1 CPU cycle at the address contained in the temporary register 625 and the data read from main storage 10 is entered in SA register 36. The contents of SA register 36 are then transferred into processor eligibility register (PER) 613 during the T2 CPU cycle.

A determination is then made as to whether or not the active processor (AP) field is equal to zero. This is accomplished by A2, S1, A2 CPU cycles and a test of the AZ latch 96. During the A2 CPU cycle the contents in register 615 are decremented by one to provide an address for addressing main storage 10 during the ensuing S1 CPU cycle where the data read from main storage 10 is entered into SA register 36. An A2 CPU cycle is then taken to subtract zero from the contents of register 36. The AZ latch 96 is then tested by control unit 100. If the AZ latch 96 is set, then the contents of the processor eligibility register (PER) 613 are logically ANDed with the inverse contents of active processor register (APR) 610. This is accomplished by T2, A2, T2 and A1 CPU cycles. During the T2 CPU cycle, the contents of active processor register (APR) 610 are transferred to SA register 36. A hexidecimal value of FF is then exclusive ORed with the contents of register 36 and the result is returned to register 36 during the A2 CPU cycle. The results in register 36 are then transferred to SB register 37 during the T2 CPU cycle. The contents of register 37 are then logically ANDed with the contents in processor eligibility register (PER) 613 during the A1 CPU cycle and the result is returned to the SB register 37. A test is then made to determine if the result entered into SB register 37 is zero. This is accomplished by testing AZ latch 96.

The next operation is to determine if only one processor is eligible to execute the task and this is accomplished by two successive T3 CPU cycles followed by T2, A2 CPU cycles and then testing the AC latch 95. The testing of the AC latch is then followed by an A2 CPU cycle followed by the testing of the AZ latch 96.

During the first T3 CPU cycle the value in SB register 37 is transferred to SA register 36. During the second T3 CPU cycle the value in SB register 37 is transferred to temporary (T1@) register 615. During the following A2 CPU cycle the value in SB register 37 is added to the contents of temporary (T1@) register 615. This operation of adding a value to itself effectively performs a shift. After the add operation, the add carry latch AC 95 is tested to see if it has been set. If it has not been set, the operation loops back to the T2 CPU cycle to transfer the contents of temporary register 615 into SB register 37 and then another add operation is performed to combine the contents of SB register 37 with the contents in temporary register 615 and the result is returned to temporary register 615. This process continues until the Add Carry Latch AC 95 is set.

After the AC latch 95 has been set, a A2 CPU cycle is taken to subtract zero from the contents of temporary (T1@) register 615. This is followed by testing the AZ latch 96. If the AZ latch is set, that is an indication that only one processor is eligible to run the task and a T2 CPU cycle is then taken to transfer the contents of the SA register 36 into the SB register 37. If the AZ latch 96 is not set, more than one processor is eligible, and then it is necessary to determine which processor is performing the lowest priority task because that is the processor to be signalled that it should invoke its task dispatcher.

If there is more than one processor eligible to perform this task, then it is first necessary to determine if the task is the last TDE on the TDQ. This test is made by taking a T2 CPU cycle to transfer the contents of the SA register 36 into the SB register 37. Another T2 CPU cycle is then taken to transfer the TDE address from TDE@ register 616 into temporary (T1@) register 615. An A2 CPU cycle is then taken to increment the contents of temporary register 615 by one. The address in the temporary register 615 is then used during a S1 CPU cycle to address main storage 10 and the data read from main storage 10 is entered into SA register 36. An A2 CPU cycle is then performed to subtract zero from the contents of SA register 36 and the AZ latch 96 is tested to determine if the result was zero or other than zero.

If the AZ latch 96 had been set, then the TDE was the last TDE on the TDQ. If AZ latch 96 was not set, then the next TDE on the TDQ is accessed. This is accomplished by two successive T2 CPU cycles. During the first T2 CPU cycle, the contents of SA register 36 are transferred to the TDE address register 616. During the second T2 CPU cycle, the contents of TDE address register 616 are transferred to temporary register 615.

The active processor (AP) field of the TDE is then ORed into the active processor register (APR) 610. This is accomplished by A2, S1 and A1 CPU cycles. During the A2 CPU cycle, the contents of temporary register 615 are incremented by two and the result is returned to the temporary register 615. The address in the temporary register 615 is then used during the S1 CPU cycle to address main storage 10 and the data read therefrom is entered into SB register 37. The data in SB register 37 is then logically ORed with the data from active processor register 610 during the A1 CPU cycle and the result is returned to the active processor register 610. The operation then loops back to the step where the contents of the processor eligibility register (PER) 610 are logically ANDed with the inverse of the active processor register where that function is performed by the T2 A2 T2 and A1 CPU cycles previously described.

This time through the loop, only one processor will be eligible and the contents of SA register 36 are transferred to SB register 37 during the T2 cycle following the testing of the AZ latch 96. An A1 CPU cycle is then taken to logically AND the contents of SB register 37 with the contents of the processor identification (PID) register 607 and the result is determined by testing the AZ latch 96. The AZ latch 96 is set if any of the eligible processors do not match the processor ID and this would be true in this instance because the processor performing the signal dispatcher cycles had just completed a task switch. The operation being performed during the signal dispatcher cycles is to determine if the task that the processor executing the signal dispatcher cycles had been running should be run on some other processor which is presently executing a lower priority task.

There will be conditions however, to be described later herein, where the AZ latch 96 is not set and the processor executing the signal dispatcher cycles will set its D latch 93 and then perform unlock cycles. Consequently in this instance the next series of operations is to signal the first eligible processor for running the task. This is accomplished by first having control unit 100 generate a lock signal and then storing the Invoke Task Dispatcher character in the signal request (SR) field of the signal object. This is accomplished by executing S3, A2, S4, A2, S4 and T2 CPU cycles. During the S3 CPU cycle, main storage 10 is accessed at a location specified by the contents of signal address (SIG@) register 614 and the data read from main storage 10 is entered into SA register 36. During the A2 CPU cycle a zero is exclusive ORed with the contents of SA register 36 and then AZ latch 96 is tested. If the AZ latch is not set, the S4 CPU cycle is taken to write the contents of SA register into main storage at the location specified by the contents of the signal address (SIG@) register 614.

After the S4 CPU cycle, the operation loops back to the S3 CPU cycle and looping continues until the results of the A2 CPU cycle cause the AZ latch 96 to be set. With the AZ latch 96 set, the A2 CPU cycle is taken to increment the contents of the SA register 36 by one. Then during the S4 CPU cycle, the contents of SA register 36 are written into main storage 10 at the location specified by the contents of the signal address (SIG@) register 614. The contents of the signal address register (SIG@) 614 are then transferred into temporary (T1@) register 615 during the following T2 CPU cycle.

The next step is to store the character designating Invoke Task Dispatcher in the signal request field. This is accomplished by A2, T1 and S2 CPU cycles. During the A2 CPU cycle the contents of the temporary (T1@) register 615 are incremented by one and the result is returned to the temporary register 615. Then during the T1 CPU cycle, the character, i.e. *, representing the command "Invoke Task Dispatcher" is entered into SA register 36. This character is then read from SA register 36 and written into main storage 10 at the location specified by the address in temporary register 615 during the S2 CPU cycle. Thus the command "Invoke Task Dispatcher" has been stored in the signal request field.

The first eligible processor is then signaled by performing T3, T1, A1, test AZ latch 96, T3, A1 and T3 CPU cycles. During the T3 CPU cycle the contents of SB register 37 are written into SA register 36. A T1 CPU cycle is then taken to put a value of hexidecimal 1 into SB register 37. The contents of SB register 37 are then logically ANDed with the contents of SA register 36 during the A1 CPU cycle and AZ latch 96 is tested to determine the results of that logical operation. If the AZ latch 96 had not been set, then the T3 cycle is taken to transfer the contents of SB register 37 into signal processor (SIGP) register 605. If the AZ latch is set, a T3 CPU cycle is taken to transfer the contents of SB register 37 into temporary (T1@) register 615. An A1 CPU cycle is then taken to add the contents of SB register 37 with the contents of temporary register 615 and the result is returned to SB register 37. The operation then loops back to the A1 CPU cycle where the contents of SB register 37 are logically ANDed with the contents of SA register 36. The looping operation continues until the result of logically ANDing the contents of SB register 37 with the contents of SA register 36 does not set the AZ latch 96. The T3 CPU cycle is then taken to transfer the contents of SB register 37 into the signal processor (SIGP) register 606. The TDQ is then unlocked and the next sequential instruction is fetched.

It should be noted that when a processor is executing signal dispatcher cycles, if the active processor (AP) field is not equal to zero, then the active processor (AP) field is ORed into the active processor (APR) register 610. This is accomplished by performing a T2 CPU cycle followed by an A1 CPU cycle. During the T2 CPU cycle the contents of SA register 36 are transferred into SB register 37. The contents of SB register 37 are then logically ORed with the contents of active processor register 610 and the result is returned to the active processor register 610 during the A1 CPU cycle.

The next operation is to determine if all the bits in the active processor register 610 are equal to one. This determination is made by taking an A2 CPU cycle where the value of hexidecimal FF is exclusive ORed with the contents from active processor register 610 and the result of that logical operation is determined by testing the AZ latch 96. If the AZ latch 96 was set as a result of that operation, unlock cycles are performed. If the AZ latch 96 had not been set, then it is necessary to determine if the TDE were the last TDE on the TDQ and the operations for performing that function have been previously described, i.e., T2, A2, S1 and A2 CPU cycles are taken and the AZ latch 96 is tested. If the AZ latch 96 had been set, then unlock cycles are performed and if AZ latch 96 is not set the operation loops back to reading the next TDE from the TDQ.

From the foregoing it is seen that unlock cycles are performed when leaving dispatch cycles and signal dispatcher cycles. After performing the unlock cycles which have been previously described, the operation returns to I-fetch cycles shown in FIG. 7. If, during the decode of the sequence control latches, it is determined that the I/O, SRD and SD latches 94, 604, 93 and 603 respectively are not set, the next sequential instruction is decoded in the manner described in the referenced U.S. Pat. No. 4,177,513. Of course, as described in the referenced U.S. Pat. No. 4,177,513, execution of the instruction could cause control to transfer to send message (SENDM) cycles, send count (SENDC) cycles, enqueue message (ENQM) cycles, receive message (RECM) cycles, receive count (RECC) cycles or dequeue message (DEQM) cycles. The send message cycles and enqueue message cycles are substantially the same as in the referenced U.S. Pat. No. 4,177,513 except that the send receive queue (SRQ) and the TDQ must be locked because these queues will be operated upon. Therefore prior to the insert cycles, FIG. 16, a T2 CPU cycle is taken to transfer the contents of the OP1 address register 54 into the LK1 address register 611. An A2 CPU cycle is then to increment the contents of the LK1 address register 611 by two and return the incremented value to the LK1 address register 611. The contents of register 611 were incremented by two so as to make the lock bit in the status byte available during the ensuring lock cycles which occur prior to the insert cycles.

Figure 16:
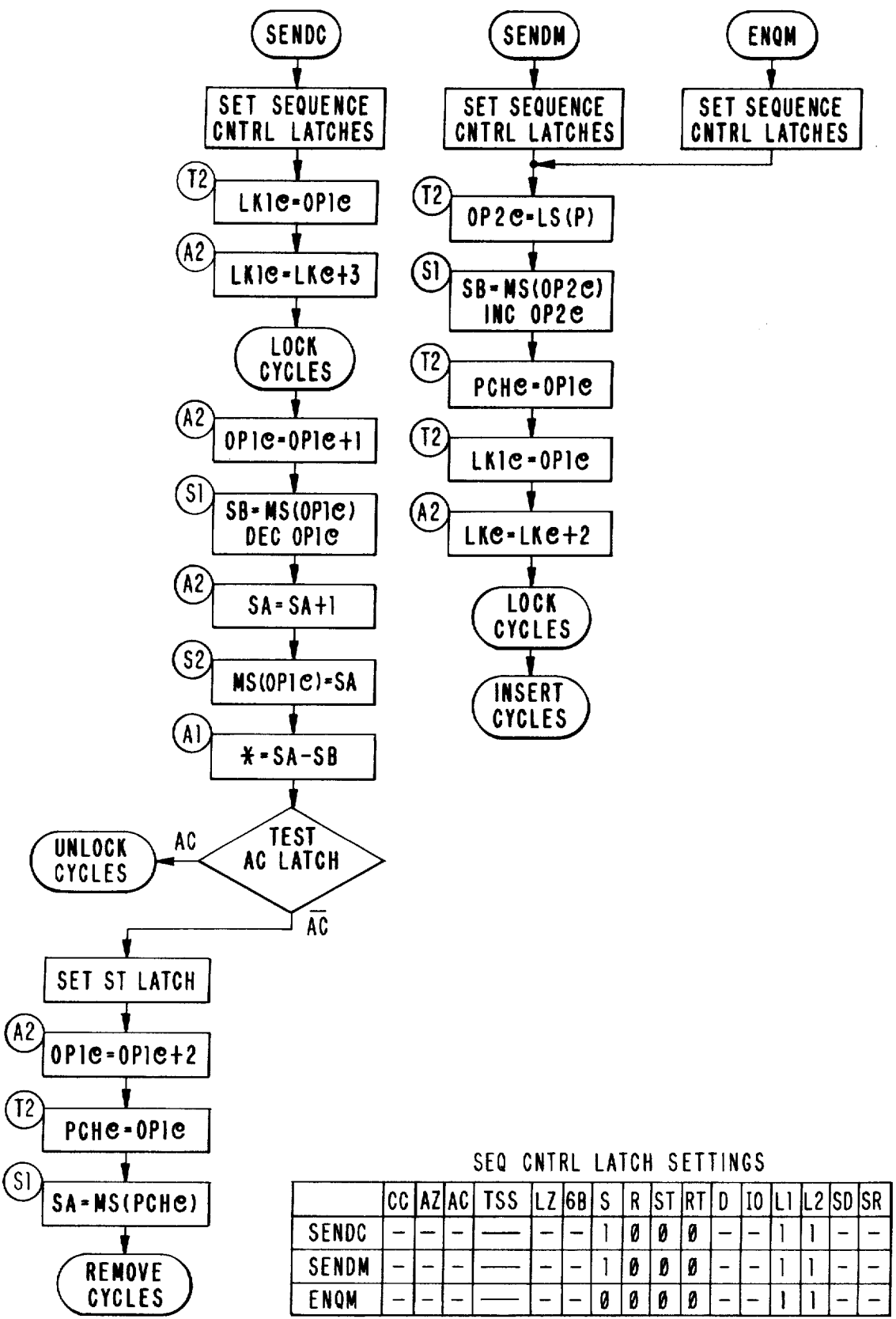
FIG. 16 is a flow diagram illustrating send count, send message and enqueue message execution cycles.
Figure 17:
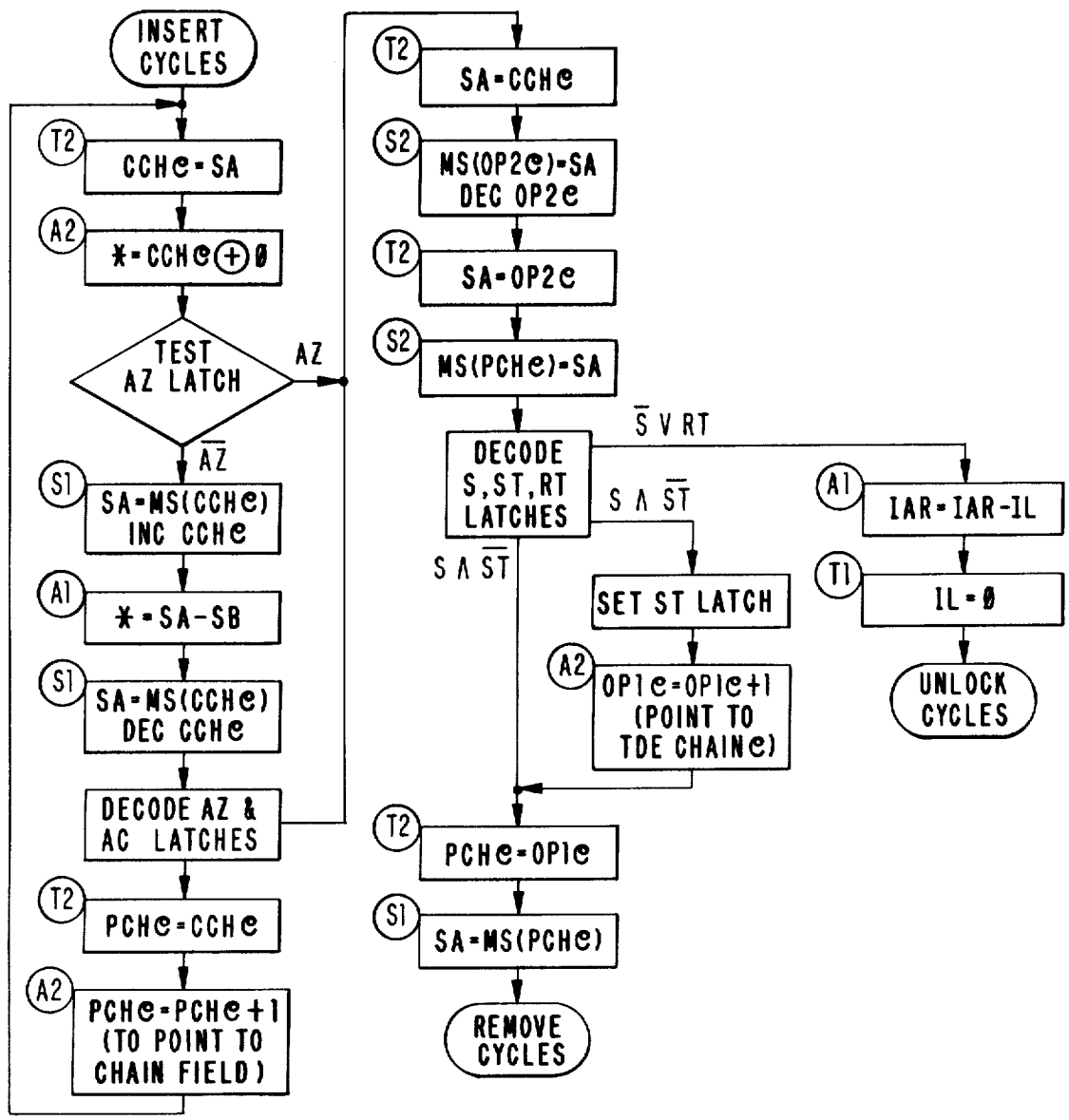
FIG. 17 is a flow diagram illustrating insert cycles.

For send count cycles, FIG. 16, the SRQ and the TDQ are locked. Prior to locking these queues, a T2 CPU cycle is taken to transfer the contents of the OP1 register 54 into the LK1 address register 611. The contents of the LK1 address register 611 are incremented by three so as to make the status byte of the SRC available during the ensuing lock cycles. After the lock cycles, the operation continues as in the referenced U.S. Pat. No. 4,177,513. However, when the AZ latch 95 is set instead of immediately proceeding to I-fetch cycles, unlock cycles are performed to unlock the SRC and the TDQ. Remove cycles are entered in the same manner as in the referenced U.S. Pat. No. 4,177,513. It should be noted that the insert cycles in FIG. 17 are the same as set forth in the referenced U.S. Pat. No. 4,177,513 except that unlock cycles must be taken to unlock the SRQ and TDQ prior to entering I-fetch cycles.

Figure 18:
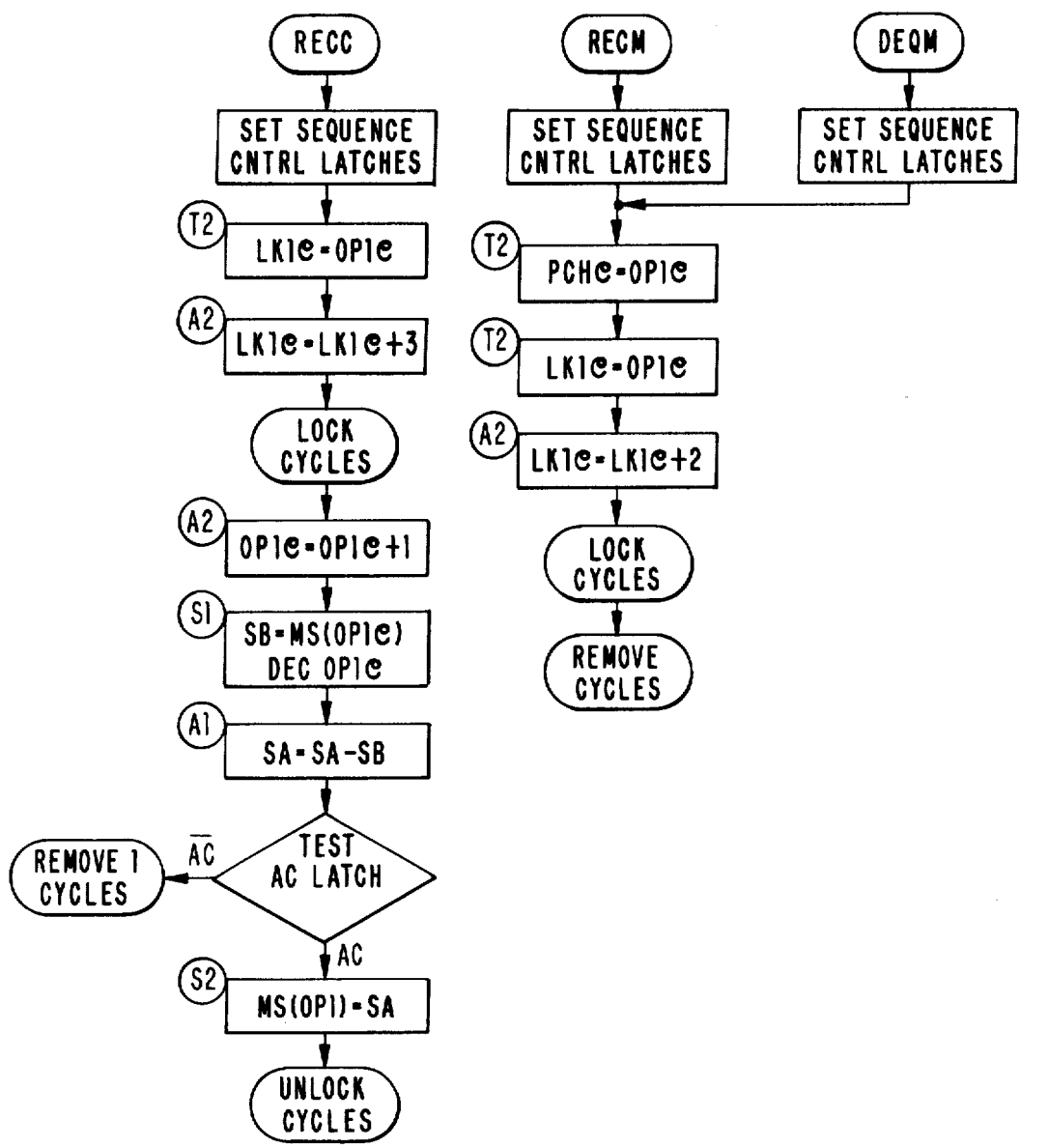
FIG. 18 is a slow diagram illustrating receive count, receive message and dequeue message execution cycles.
Figure 19:
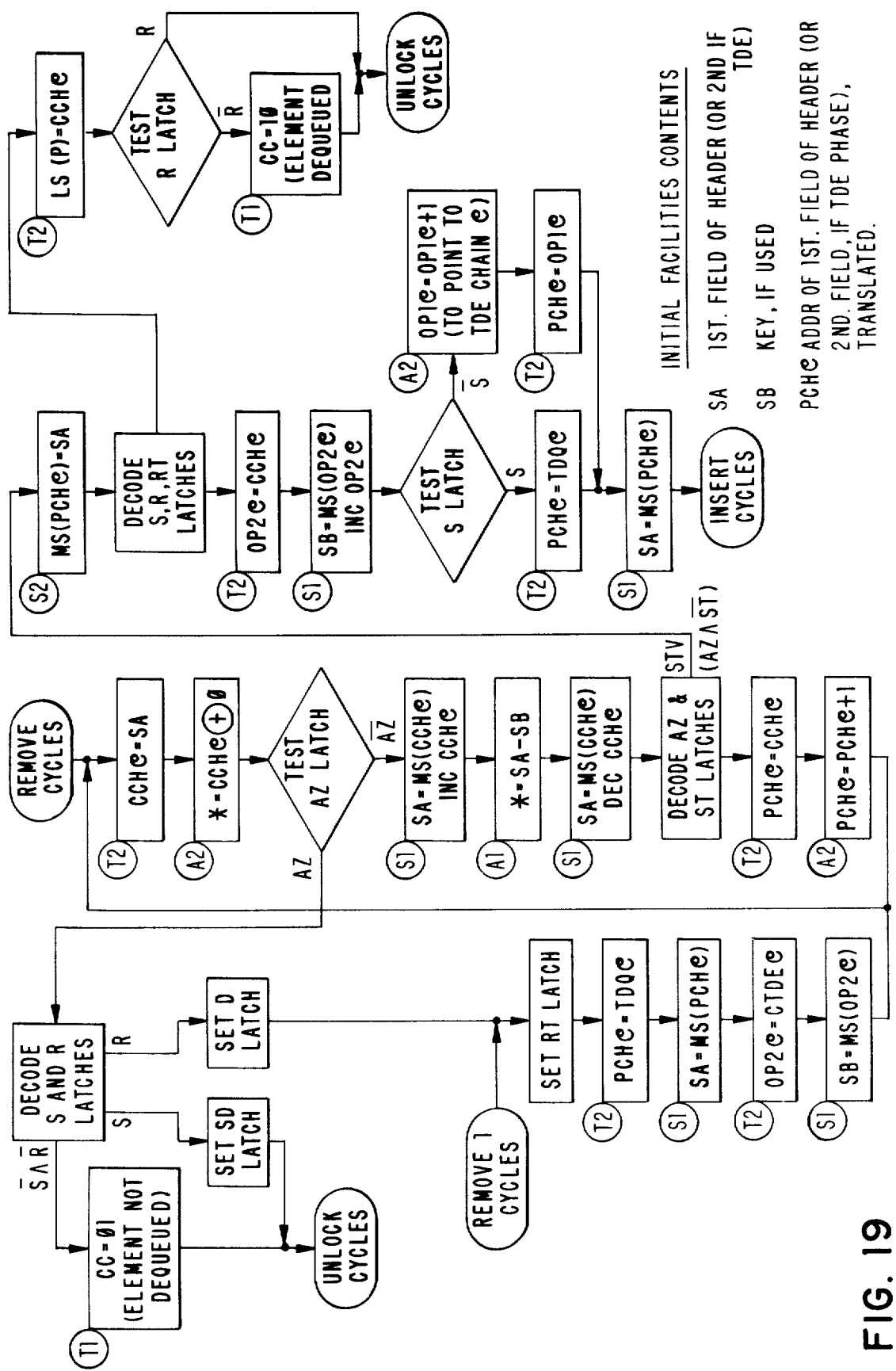
FIG. 19 is a flow diagram illustrating remove cycles.

The receive message (RECM) and dequeue message (DEQM) cycles in FIG. 18 are changed from the corresponding cycles in the referenced U.S. Pat. No. 4,177,513 in that it is necessary to lock the SRQ and the TDQ in a manner as described in connection with the send message (SENDM) and enqueue message (ENQM) cycles. A T2 CPU cycle is taken to transfer the contents of the OP1 address register 54 into the LK1@ register 611 and then the contents of the LK1@ register 611 are incremented by two during the following A2 CPU cycle. Lock cycles are then performed to lock the SRQ and the TDQ prior to entering remove cycles. The remove cycles in FIG. 19 have been changed from the remove cycles set forth in the referenced U.S. Pat. No. 4,177,513. During the remove cycles, instead of proceeding directly to the I-fetch cycles, unlock cycles are taken. Also, when the operation is to decode the S and R latches 87 and 88, if the S latch is set, then the SD latch 603 is set and if the R latch 88 is set, then the D latch 93 is set.

If the SD latch 603 is set the next operation is to perform unlock cycles whereas if the D latch 93 is set the next action taken is to set the RT latch as in the referenced U.S. Pat. No. 4,177,513. In this instance there is no need to test the S latch because only the R latch decode is used to set the D latch 93.

The receive count (RECC) cycles in FIG. 18 differ from the receive count (RECC) cycles of the referenced U.S. Pat. No. 4,177,513 in that it is necessary to lock the receive counter and the TDQ. This is accomplished by taking a T2 CPU cycle where the contents of the OP1 address (OP1@) register 54 are transferred to the LK1@ register 611 and the contents in the LK1@ register 611 are then incremented by three whereby the status byte of the send receive counter (SRC), FIG. 3, is available during the ensuing lock cycles. From there on the ensuring cycles for the receive count (RECC) cycles are the same as in the referenced U.S. Pat. No. 4,177,513 except that unlock cycles are taken prior to entering I-fetch cycles.

In some instances the processor which invokes its signal dispatcher in response to a TDE being enqueued on the TDQ is the one which should do a task switch, i.e., runs its task dispatcher. When this situation occurs, the contents of SB register 37 are logically ANDed with the processor ID (PID) during the A1 CPU cycle of the signal dispatcher cycles, FIG. 13-2. The result does not cause the AZ latch 96 to be set. Thus, when the AZ latch is tested it will be found to be off and the D latch 93 will be set. The operation then switches to unlock cycles which have been previously described. It will be recalled that at the end of unlock cycles, the operation switches to I-fetch cycles. During the I-fetch cycles the D latch 93 will be decoded as being set and, consequently, dispatch cycles will be entered and the task switch takes place in the manner previously described.

From the foregoing it is seen that the invention provides task handling apparatus for a multiprocessor computer system where the tasks are distributed to the available processors. Each task is dispatched on the first available processor that can accept it. The signal dispatcher determines which processor is eligible to execute a higher priority task than is being currently executed by that processor. The signal dispatcher signals the eligible processor to activate its task dispatcher. The task dispatcher in the eligible processor performs the task switch and determines which task is to be dispatched. The processor performing the task switch runs its signal dispatcher to determine if the task it had been performing should be run by some other processor. When the processor which is running its signal dispatcher is the processor to do the task switch, it leaves the signal dispatcher cycles and switches to task dispatching cycles without any signaling taking place. The present invention thus provides an advantage over the prior art in that it ensures that a processor of a multiprocessor system is processing the highest priority task that it is able to process.

I claim:

1. Tasking apparatus for a multiprocessor computer system including at least two processors sharing a common main storage containing a task dispatching queue adapted to have task dispatching elements enqueued in priority sequence, each processor having a task dispatcher for dispatching task dispatching elements from said task dispatching queue and for performing task switches when its associated processor is processing a task dispatching element having a priority lower than the priority of a waiting dispatchable task dispatching element on said task dispatching queue, said processors each having an enqueueing mechanism for returning waiting non-dispatchable task dispatching elements to said task dispatching queue, the improvement comprising:

a signal dispatcher for each processor for scanning the priorities of task dispatching elements on said task dispatching queue and signaling another processor to operate its task dispatcher upon finding a task dispatching element on said task dispatching queue having a priority higher than the priority of the task dispatching element being processed by the processor to be signaled, said signal dispatcher being rendered operable in response to said enqueueing mechanism of the associated processor enqueueing a task dispatching element on said task dispatching queue.

2. The tasking apparatus of claim 1 wherein said task dispatching elements include an encoded field for indicating which of said processors are eligible to process said task dispatching elements.

3. The tasking apparatus of claim 1 wherein said task dispatching elements include an encoded field for indicating which processor, if any, is processing the task dispatching element.

4. The tasking apparatus of claim 1 wherein said processor signaled to operate its task dispatcher, to perform a task switch, operates its signal dispatcher upon completing said task switch.

5. The tasking apparatus of claim 1 further comprising locking means selectively operable for locking access to said main storage, unlocking means selectively operable for locking access to said main storage, each of said task dispatchers, said signals dispatchers and said enqueueing mechanisms including means for selectively operating said locking and said unlocking means.

6. The tasking apparatus of claim 5 wherein the signal dispatcher of one processor selectively operates said locking means and the task dispatcher in the processor being signaled selectively operates said unlocking means.

* * * * *